(12) United States Patent
Gueron et al.

(10) Patent No.: US 10,623,175 B2
(45) Date of Patent: *Apr. 14, 2020

(54) SM3 HASH ALGORITHM ACCELERATION PROCESSORS, METHODS, SYSTEMS, AND INSTRUCTIONS

(71) Applicant: Intel Corporation, Santa Clara, CA (US)

(72) Inventors: Shay Gueron, Haifa (IL); Vlad Krasnov, Nesher (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/973,015

(22) Filed: May 7, 2018

(65) Prior Publication Data

US 2018/0359083 A1 Dec. 13, 2018

Related U.S. Application Data

(63) Continuation of application No. 15/132,208, filed on Apr. 18, 2016, now Pat. No. 9,979,538, which is a (Continued)

(51) Int. Cl.
*H04L 9/06* (2006.01)
*G06F 9/30* (2018.01)
(Continued)

(52) U.S. Cl.
CPC .......... *H04L 9/0643* (2013.01); *G06F 9/3001* (2013.01); *G06F 9/30007* (2013.01);
(Continued)

(58) Field of Classification Search
CPC ... G06F 9/30036; G06F 21/72; H04L 9/0643; H04L 9/3234
See application file for complete search history.

(56) References Cited

U.S. PATENT DOCUMENTS 4,250,483 A 2/1981 Rubner
5,339,398 A 8/1994 Shah et al.
(Continued)

FOREIGN PATENT DOCUMENTS

CN 1684412 A 10/2005
CN 103457719 A 12/2013
(Continued)

OTHER PUBLICATIONS

Yuan Ma, Luning Xia, Jingqiang Lin, Jiwu Jing, Zongbin Liu, and Xingjie Yu. 2012. Hardware performance optimization and evaluation of SM3 hash algorithm on FPGA. In Proceedings of the 14th international conference on Information, Tat Wing Chim and Tsz Hon Yuen (Eds.). Springer-Verlag, Berlin (Year: 2012).*

(Continued)

*Primary Examiner* — Alexander Lagor
(74) *Attorney, Agent, or Firm* — NDWE, LLP

(57) ABSTRACT

A processor includes a decode unit to decode an SM3 two round state word update instruction. The instruction is to indicate one or more source packed data operands. The source packed data operand(s) are to have eight 32-bit state words $A_j$, $B_j$, $C_j$, $D_j$, $E_j$, $F_j$, $G_j$, and $H_j$ that are to correspond to a round (j) of an SM3 hash algorithm. The source packed data operand(s) are also to have a set of messages sufficient to evaluate two rounds of the SM3 hash algorithm. An execution unit coupled with the decode unit is operable, in response to the instruction, to store one or more result packed data operands, in one or more destination storage locations. The result packed data operand(s) are to have at least four two-round updated 32-bit state words $A_{j+2}$, $B_{j+2}$, $E_{j+2}$, and $F_{j+2}$, which are to correspond to a round (j+2) of the SM3 hash algorithm.

1 Claim, 16 Drawing Sheets

Related U.S. Application Data continuation of application No. 14/477,552, filed on Sep. 4, 2014, now Pat. No. 9,317,719.

(51) Int. Cl.
  *G06F 9/38* (2018.01)
  *G09C 1/00* (2006.01)
  *G06F 21/72* (2013.01)

(52) U.S. Cl.
  CPC ........ *G06F 9/3016* (2013.01); *G06F 9/30018* (2013.01); *G06F 9/30036* (2013.01); *G06F 9/3895* (2013.01); *G06F 21/72* (2013.01); *G09C 1/00* (2013.01); *H04L 2209/125* (2013.01)

(56) References Cited

U.S. PATENT DOCUMENTS

| | | | |
|---|---|---|---|
| 5,608,801 A | 3/1997 | Aiello et al. | |
| 5,649,179 A | 7/1997 | Steenstra et al. | |
| 5,920,900 A | 7/1999 | Poole et al. | |
| 5,960,434 A | 9/1999 | Schimmel | |
| 6,067,547 A | 5/2000 | Douceur | |
| 6,189,086 B1 | 2/2001 | Yamaura | |
| RE37,178 E | 5/2001 | Kingdon | |
| 6,226,710 B1 | 5/2001 | Melchior | |
| 6,260,055 B1 | 7/2001 | Sugeno et al. | |
| 6,307,955 B1 | 10/2001 | Zank et al. | |
| 6,360,218 B1 | 3/2002 | Zander et al. | |
| 6,470,329 B1 | 10/2002 | Livschitz | |
| 6,539,373 B1 | 3/2003 | Guha | |
| 6,578,131 B1 | 6/2003 | Larson et al. | |
| 6,594,665 B1 | 7/2003 | Sowa et al. | |
| 6,631,419 B1 | 10/2003 | Greene | |
| 6,952,770 B1 | 10/2005 | Mittal et al. | |
| 7,047,394 B1 | 5/2006 | Van et al. | |
| 7,073,059 B2 | 7/2006 | Worely et al. | |
| 7,165,135 B1 | 1/2007 | Christie et al. | |
| 7,240,203 B2 | 7/2007 | Kessler et al. | |
| 7,373,514 B2 | 5/2008 | Krueger et al. | |
| 7,599,489 B1 | 10/2009 | Spracklen | |
| 7,684,563 B1 | 3/2010 | Olson et al. | |
| 7,725,624 B2 | 5/2010 | Feghali et al. | |
| 7,743,235 B2 | 6/2010 | Wolrich et al. | |
| 8,020,142 B2 | 9/2011 | Wolrich et al. | |
| 8,073,892 B2 | 12/2011 | Feghali et al. | |
| 8,255,703 B2 | 8/2012 | Crispin et al. | |
| 8,316,191 B2 | 11/2012 | Wheeler et al. | |
| 8,504,802 B2 | 8/2013 | Valentine et al. | |
| 8,634,550 B2 | 1/2014 | Gueron et al. | |
| 8,924,741 B2 | 12/2014 | Wolrich et al. | |
| 9,317,719 B2 | 4/2016 | Gueron et al. | |
| 9,658,854 B2 | 5/2017 | Wolrich et al. | |
| 9,912,481 B2 | 3/2018 | Wolrich et al. | |
| 2002/0032551 A1 | 3/2002 | Zakiya | |
| 2002/0184498 A1 | 12/2002 | Qi | |
| 2002/0191791 A1 | 12/2002 | Anand | |
| 2003/0172252 A1 | 9/2003 | Henry et al. | |
| 2003/0185391 A1 | 10/2003 | Qi et al. | |
| 2004/0015579 A1 | 1/2004 | Cooper et al. | |
| 2004/0042470 A1 | 3/2004 | Cooper et al. | |
| 2005/0044134 A1 | 2/2005 | Krueger et al. | |
| 2005/0089160 A1 | 4/2005 | Crispin et al. | |
| 2006/0056620 A1 | 3/2006 | Shingal et al. | |
| 2006/0136718 A1 | 6/2006 | Moreillon | |
| 2009/0310775 A1 | 12/2009 | Gueron et al. | |
| 2010/0214301 A1 | 8/2010 | Li et al. | |
| 2010/0250965 A1 | 9/2010 | Olson et al. | |
| 2010/0250966 A1 | 9/2010 | Olson et al. | |
| 2011/0276790 A1 | 11/2011 | Olson et al. | |
| 2012/0257742 A1 | 10/2012 | Ebeid et al. | |
| 2012/0328097 A1 | 12/2012 | Sheikh et al. | |
| 2013/0010955 A1 | 1/2013 | Lu et al. | |
| 2013/0132737 A1 | 5/2013 | Horsnell et al. | |
| 2013/0283064 A1 | 10/2013 | Yap et al. | |
| 2013/0332742 A1 | 12/2013 | Gueron et al. | |
| 2013/0332743 A1 | 12/2013 | Gueron et al. | |
| 2014/0019693 A1 | 1/2014 | Gulley et al. | |
| 2014/0019694 A1 | 1/2014 | Gulley et al. | |
| 2014/0093069 A1 | 4/2014 | Wolrich et al. | |
| 2014/0095891 A1 | 4/2014 | Wolrich et al. | |
| 2014/0185793 A1 | 7/2014 | Wolrich et al. | |
| 2014/0189368 A1 | 7/2014 | Wolrich et al. | |
| 2014/0195782 A1 | 7/2014 | Yap et al. | |
| 2014/0331291 A1 | 11/2014 | Zou et al. | |
| 2014/0362098 A1 | 12/2014 | Kerofsky | |
| 2015/0043729 A1 | 2/2015 | Gopal et al. | |
| 2015/0067302 A1 | 3/2015 | Gueron et al. | |
| 2015/0082002 A1 | 3/2015 | Parra et al. | |
| 2015/0086019 A1 | 3/2015 | Tamminen et al. | |
| 2015/0124970 A1 | 5/2015 | Li et al. | |
| 2015/0178086 A1 | 6/2015 | Hughes et al. | |
| 2015/0186138 A1 | 7/2015 | Wolrich et al. | |
| 2015/0186139 A1 | 7/2015 | Wolrich et al. | |
| 2015/0280917 A1* | 10/2015 | Wolrich .............. | G06F 12/0811 713/193 |
| 2016/0026468 A1 | 1/2016 | Gueron et al. | |
| 2016/0070931 A1 | 3/2016 | Gueron et al. | |
| 2016/0191252 A1 | 6/2016 | Li et al. | |

FOREIGN PATENT DOCUMENTS

| | | |
|---|---|---|
| CN | 103477341 A | 12/2013 |
| CN | 103490895 A | 1/2014 |
| CN | 104012032 A | 8/2014 |
| EP | 0354774 A2 | 2/1990 |
| EP | 1596281 A2 | 11/2005 |
| EP | 2889760 A2 | 7/2015 |
| EP | 2890044 A2 | 7/2015 |
| GB | 1494750 A | 12/1977 |
| GB | 2496934 A | 5/2013 |
| JP | 2004109420 A | 4/2004 |
| JP | 2012252281 A | 12/2012 |
| TW | 200945198 A | 11/2009 |
| TW | 201332329 A | 8/2013 |
| WO | 03050784 A1 | 6/2003 |
| WO | 03090074 A2 | 10/2003 |
| WO | 2006098015 A1 | 9/2006 |
| WO | 2013072657 A1 | 5/2013 |
| WO | 2013095503 A1 | 6/2013 |
| WO | 2013147877 A1 | 10/2013 |
| WO | 2014051751 A1 | 4/2014 |
| WO | 2014105135 A1 | 7/2014 |
| WO | 2015053945 A1 | 4/2015 |
| WO | 2016036491 A1 | 3/2016 |
| WO | 2017030600 A1 | 2/2017 |

OTHER PUBLICATIONS

S. Shen, Ed.; S. Shen, Ed.; "SM3 Hash function draft-shen-snn3-hash-00", Chinese Academy of Science, Oct. 24, 2011 (Year: 2011).*

Florian Mendel, Tomislav Nad, and Martin Schlaffer. 2013. Finding collisions for round-reduced SM3. In Proceedings of the 13th international conference on Topics in Cryptology (CT-RSA'13), Ed Dawson (Ed.). Springer-Verlag, Berlin, Heidelberg, 174-188. (Year: 2013).*

Aleksandar Kircanski, Yanzhao Shen, Gaoli Wangy, Amr M. Youssef; "Boomerang and Slide-Rotational Analysis of the SM3 Hash Function"; SAC 2012, LNCS 7707, pp. 304-320, 2013. (Year: 2013).*

Abandonment from U.S. Appl. No. 15/911,620, mailed Dec. 4, 2018, 2 pages.

Advisory Action from Appl. No. 15/600,200, dated Jul. 6, 2018, 3 pages.

Alcantarad A., et al., "Real-Time Parallel Hashing on the GPU," ACM Transactions on Graphics, Dec. 2009, 9 pages.

Ao, et al., "A Compact Hardware Implementation of SM3 Hash Function," IEEE 13th International Conference on Trust, Security and Privacy in Computing and Communications, Sep. 2014, pp. 846-850.

(56) References Cited

OTHER PUBLICATIONS

Summons to attend oral proceedings pursuant to Rule 115(1) EPC for Application No. 14194120.3, mailed Oct. 30, 2018, 6 pages.
Communication pursuant to Rules 70(2) and 70a(2) EPC for Application No. 15837850.5, dated Apr. 20, 2018, 1 page.
Decision of Refusal from foreign counterpart Japanese Patent Application No. 2017-511254, dated Dec. 4, 2018, 3 pages.
Deepakumara J., et al., "FPGA Implementation of MD5 Hash Algorithm," Canadian Conference on Electrical and Computer Engineering, vol. 2, May 2001, pp. 919-924.
Extended European Search report for Application No. 14194120.3, dated Jul. 10, 2015, 7 pages.
Extended European Search Report for Application No. 15837850.5, dated Apr. 4, 2018, 11 pages.
Final Office Action from U.S. Appl. No. 14/142,745, dated Jan. 30, 2018, 40 pages.
Final Office Action from U.S. Appl. No. 14/142,745, dated Sep. 15, 2016, 18 pages.
Final Office Action from U.S. Appl. No. 14/228,056, dated Sep. 9, 2016, 19 pages.
Final Office Action from U.S. Appl. No. 15/132,208, dated May 9, 2017, 5 pages.
Final Office Action from U.S. Appl. No. 15/600,200, dated Jan. 18, 2018, 33 pages.
FIPS PUB 180-1, "Secure Hash Standard," Secretary of Commerce, National Institute of Standards and Technology, Apr. 17, 1995, 17 pages.
First Office Action and Search Report from foreign counterpart Chinese Patent Application No. 201580040783.9, dated May 3, 2018, 46 pages. (English Translation available for Office Action only).
Gopal V., et al., "Processing Multiple Buffers in Parallel to Increase Performance on Intel® Architecture Processors," Jul. 2010, 24 Pages.
Gueron S., et al., "Parallelizing Message Schedules to Accelerate the Computations of Hash Functions" Journal of Cryptographic Engineering, Jun. 5, 2012, vol. 2 (4), 20 pages.
Guilford J., et al., "Fast SHA-256 Implementations on Intel Architecture Processors," May 2012, 18 pages.
Guilford J., et al., "Fast SHA512 Implementations on Intel® Architecture Processors,", Intel® Intelligent System, Nov. 2012, 12 Pages.
Gulley S., et al., "Intel SHA Extensions; New Instructions Supporting the Secure Hash Algorithm on Intel Architecture Processors," Paper, Jul. 2013, 22 Pages.
Gulley S., et al., "Multi-Hash: A Family of Cryptographic Hash Algorithm Extensions," Jul. 2012, 16 pages.
Hu Y., et al., "Hardware Design and Implementation of SM3 Hash Algorithm for Financial IC Card," Tenth International Conference on Computational Intelligence and Security, Nov. 2014, pp. 514-518.
Intel, "Intel 64 and IA-32 Architectures Software Developer's Manual," Instruction Set Reference, A-Z, Order No. 325383-040US, vol. 2 (2A, 2B & 2C), Oct. 2011, 1721 pages.
Intel, "Intel 64 and IA-32 Architectures Software Developer's Manual," vol. 1: Basic Architecture, Order No. 253665-040US, Oct. 2011, 548 pages.
Intel, "Intel 64 and IA-32 Architectures Software Developer's Manual," vol. 2 (2A and 2B): Instruction Set Reference, A-Z, Order No. 325383-039US, May 2011, 1643 Pages.
Intel, "Intel 64 and IA-32 Architectures Software Developer's Manual" vol. 3 (3A, 3B & 3C): System Programming Guide, Order No. 325384-040US, Oct. 2011, 1916 pages.
Intel, "Intel Advanced Vector Extensions Programming Reference," Document reference No. 319433-011, Jun. 2011, 595 pages.
International Preliminary Report on Patentability for Application No. PCT/US2015/045169, dated Mar. 16, 2017, 8 pages.
International Preliminary Report on Patentability for Application No. PCT/US2015/065134, dated Mar. 1, 2018, 16 pages.
International Search Report and Written Opinion for Application No. PCT/US2015/045169, dated Nov. 27, 2015, 11 pages.
International Search Report and Written Opinion for Application No. PCT/US2015/065134, dated Jul. 11, 2016, 19 pages.
Jarvinen K., et al., "Hardware Implementation Analysis of the MD5 Flash Algorithm," Proceedings of the 38th Hawaii International Conference on System Sciences, 2005, pp. 1-10.
Kircanski A., et al., "Boomerang and Slide-Rotational Analysis of the SM3 Hash Function," International Conference on Selected Areas in Cryptography, SAC 2012, Aug. 15, 2012, pp. 304-320.
Kircanski A., et al., "Boomerang and Slide-Rotational Analysis of the SM3 Hash Function," Selected Areas in Cryptography, Springer, 2013, vol. 7707, pp. 304-320.
Ma Y., et al., "Hardware Performance Optimization and Evaluation of SM3 Hash Algorithm on FPGA," Proceedings of the 14th International Conference on Information and Communications Security, Oct. 2012, pp. 105-118.
Mendal F., et al., "Finding collisions for round-reduced SM3," in Proceedings of the 13th international conference on Topics in Cryptology (CT-RSA'13), Feb. 2013, pp. 174-188.
Niakajima J., et al., "Performance Analysis and Parallel Implementation of Dedicated Hash Functions," Eurocrypt 02 Proceedings of the International Conference on the Theory and Applications of Cryptographic Techniques: Advances in Cryptology, 2002, 16 pages.
Non-Final Office Action from U.S. Appl. No. 15/600,200, dated Oct. 4, 2018, 14 pages.
Non-Final Office Action from U.S. Appl. No. 14/142,745, dated Jun. 14, 2017, 17 pages.
Non-Final Office Action from U.S. Appl. No. 14/142,745, dated Mar. 23, 2016, 18 pages.
Non-Final Office Action from U.S. Appl. No. 14/142,745, dated Nov. 26, 2018, 19 pages.
Non-Final Office Action from U.S. Appl. No. 14/228,056, dated Jan. 15, 2016, 11 pages.
Non-Final Office Action from U.S. Appl. No. 14/228,056, dated Mar. 24, 2017, 12 pages.
Non-Final Office Action from U.S. Appl. No. 14/498,931, dated Apr. 8, 2016, 14 pages.
Non-Final Office Action from U.S. Appl. No. 14/568,101, dated Feb. 8, 2017, 14 pages.
Non-Final Office Action from U.S. Appl. No. 14/568,101, dated Oct. 6, 2017, 10 pages.
Non-Final Office Action from U.S. Appl. No. 14/880,166, dated Apr. 12, 2017, 11 pages.
Non-Final Office Action from U.S. Appl. No. 15/132,208, dated Jul. 18, 2016, 17 pages.
Non-Final Office Action from U.S. Appl. No. 15/600,200, dated Jul. 3, 2017, 14 pages.
Notice of Allowance and Search Report from foreign counterpart Taiwan Patent Application No. 105144233, dated Sep. 29, 2017, 4 pages.
Notice of Allowance from foreign counterpart Japanese Patent Application No. 2015-028528, dated Oct. 4, 2016, 3 pages.
Notice of Allowance from foreign counterpart Korean Patent Application No. 10-2015-0028373, dated Jan. 24, 2017, 3 pages.
Notice of Allowance from foreign counterpart Taiwan Patent Application No. 104127017, dated May 27, 2016, 4 pages.
Notice of Allowance from foreign counterpart Taiwanese Patent Application No. 104105374, dated Nov. 28, 2016, 2 pages.
Notice of Allowance from foreign counterpart United Kingdom Patent Application No. 1503156.0, dated Nov. 15, 2016, 2 pages.
Notice of Allowance from U.S. Appl. No. 13/731,004 dated Sep. 2, 2014, 12 pages.
Notice of Allowance from U.S. Appl. No. 14/228,056, dated Oct. 19, 2017, 27 pages.
Notice of Allowance from U.S. Appl. No. 14/477,552, dated Dec. 21, 2015, 17 pages.
Notice of Allowance from U.S. Appl. No. 14/477,552, dated Mar. 1, 2016, 2 pages.
Notice of Allowance from U.S. Appl. No. 14/568,101, dated May 22, 2017, 12 pages.
Notice of Allowance from U.S. Appl. No. 15/132,208, dated Feb. 7, 2018, 5 pages.

(56) References Cited

OTHER PUBLICATIONS

Notice of Allowance from U.S. Appl. No. 15/132,208, dated Jan. 19, 2018, 17 pages.
Notice of Allowance from U.S. Appl. No. 14/498,931, dated Jan. 13, 2017, 11 pages.
Notice of Preliminary Rejection from foreign counterpart Korean Application No. 10-2015-0028373, dated Jul. 18, 2016, 5 pages.
Notice of Preliminary Rejection from foreign counterpart Korean Patent Application No. 10-2017-7003127, dated Aug. 16, 2018, 9 pages.
Notification of Reasons for Refusal from foreign counterpart Japanese Patent Application No. 2017-51125, dated May 22, 2018, 4 pages.
Office Action and Search Report from foreign counterpart Taiwanese Patent Application No. 104105374, dated May 26, 2016, 18 pages.
Office Action for European Patent Application No. 141941203, dated Apr. 4, 2017, 5 Pages.
Office Action from foreign counterpart Chinese Patent Application No. 201510096246.8, dated Jul. 31, 2017, 10 pages.
Office Action from foreign counterpart Japanese Patent Application No. 2015-028528, dated May 24, 2016, 4 pages.
Office Action from foreign counterpart United Kingdom Patent Application No. 1503156.0, dated Aug. 21, 2015, 4 pages.
Office Action from foreign counterpart United Kingdom Patent Application No. 1503156.0, dated Jun. 3, 2016, 1 page.
Shen S., et al., "SM3 Hash Function: draft-shen-sm3-hash-01," IETF Internet-Draft, Chinese Academy of Science, version 01, Feb. 14, 2014, 13 pages.
Shen S., et al., "SM3 Hash function," Internet Engineering Task Force, Internet-Draft, draft-shen-sm3-hash-00, Oct. 24, 2011, 16 pages Retrieved from: https://tools.ietf.org/pdf/draft-shen-sm3-hash-00.pdf.
U.S. Department of Commerce, Computer Systems Laboratory, "Secure Hash Standard," (FIPS PUB 180-1) Federal Information Processing Standards Publication, Washington D.C., Apr. 17, 1995, 24 pages.
Wang G., et al., "Preimage and Pseudo-Collision Attacks on Step-Reduced SM3 Hash Function," Jun. 24, 2013, 13 pages.
Decision to Grant a Patent from counterpart Japanese Patent Application No. 2017-511254 dated May 7, 2019, 2 pages.
Final Office Action from U.S. Appl. No. 15/600,200, dated May 1, 2019, 25 pages.
Grant of Patent from foreign counterpart Korean Patent Application No. 10-2017-7003127, dated May 7, 2019, 6 pages.
Extended European Search Report for Application No. 15901867.0, dated Jun. 26, 2019, 17 pages.
Notice of Allowance from U.S. Appl. No. 14/142,745, dated Jul. 29, 2019, 22 pages.
Second Office Action from foreign counterpart Chinese Patent Application No. 201580040783.9, dated Apr. 9, 2019, 51 pages.
Partial Supplementary European Search Report for Application No. 15901867.0, dated Mar. 18, 2019, 18 pages.
Second Office Action from foreign counterpart Chinese Patent Application No. 201580040783.9, dated Apr. 9, 2019, 20 pages.

\* cited by examiner

FIG. 2

$ABCDEFGH \leftarrow V^{(i)}$
FOR $j=0$ TO 63
$SS1 \leftarrow ((A \lll 12) + E + (T_j \lll j)) \lll 7$
$SS2 \leftarrow SS1 \oplus (A \lll 12)$
$TT1 \leftarrow FF_j(A,B,C) + D + SS2 + W'_j$
$TT2 \leftarrow GG_j(E,F,G) + H + SS1 + W_j$
$D \leftarrow C$
$C \leftarrow B \lll 9$
$B \leftarrow A$
$A \leftarrow TT1$
$H \leftarrow G$
$G \leftarrow F \lll 19$
$F \leftarrow E$
$E \leftarrow P_0(TT2)$
ENDFOR
$V^{(i+1)} \leftarrow ABCDEFGH \oplus V^{(i)}$

213 SINGLE ROUND

212

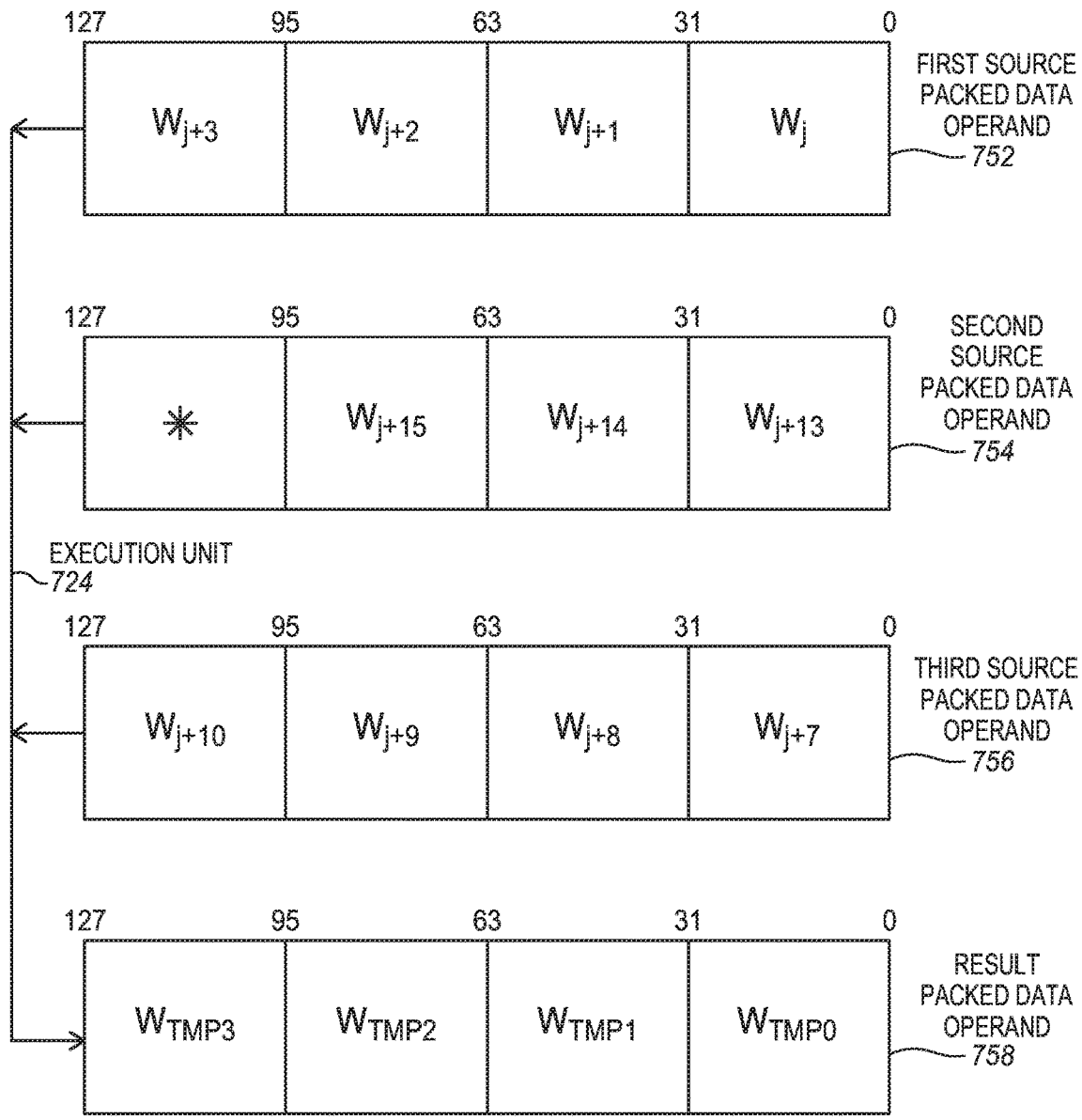

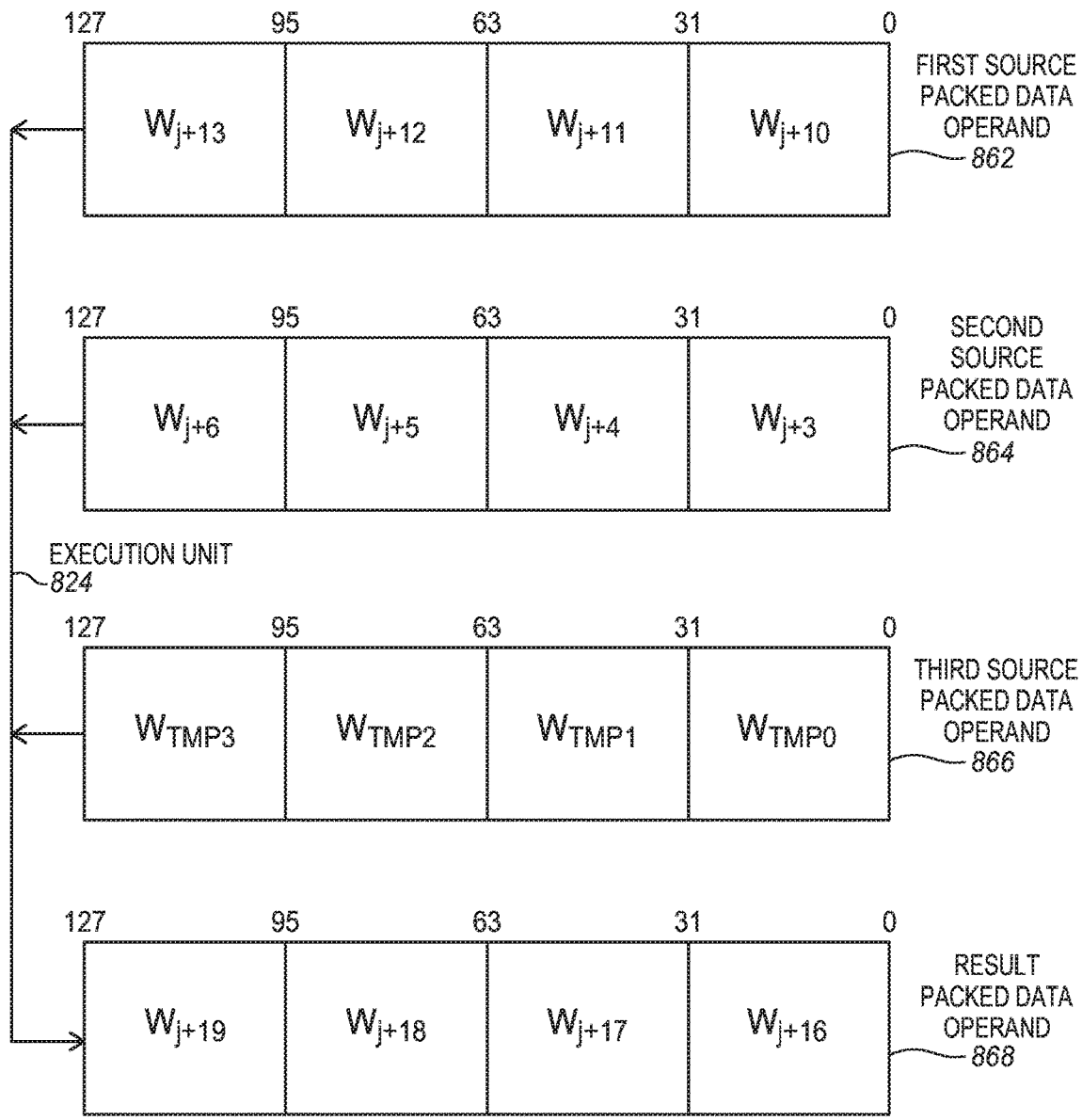

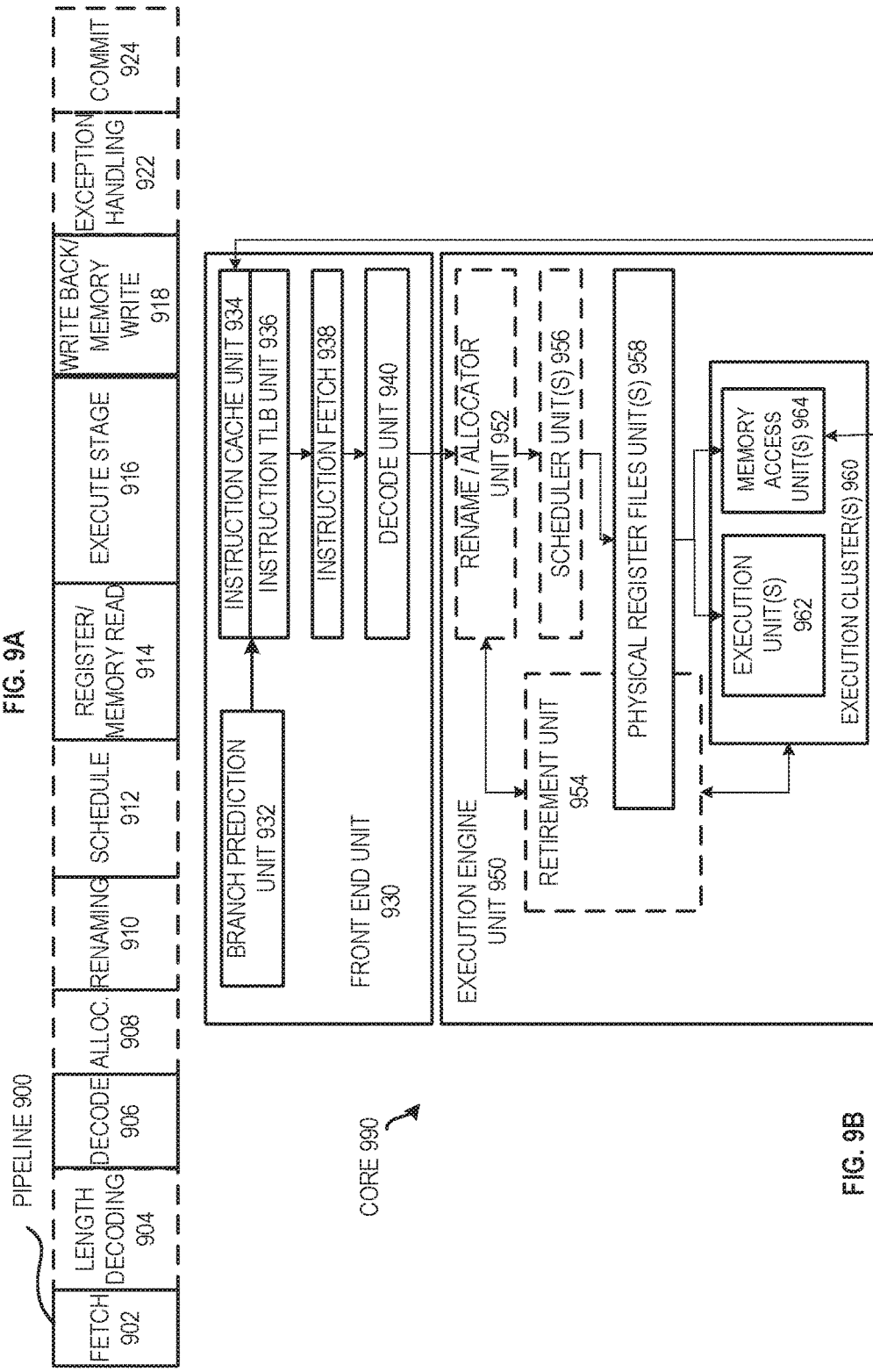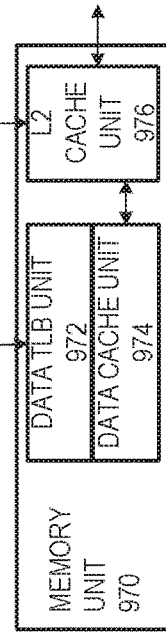

SM3 HASH ALGORITHM ACCELERATION PROCESSORS, METHODS, SYSTEMS, AND INSTRUCTIONS

RELATED APPLICATIONS

The present application is a continuation of U.S. patent application Ser. No. 15/132,208, filed on Apr. 18, 2016, entitled "SM3 HASH ALGORITHM ACCELERATION PROCESSORS, METHODS, SYSTEMS, AND INSTRUCTIONS", which is a continuation of U.S. patent application Ser. No. 14/477,552, filed on Sep. 4, 2014, entitled "SM3 HASH ALGORITHM ACCELERATION PROCESSORS, METHODS, SYSTEMS, AND INSTRUCTIONS", now patented as U.S. Pat. No. 9,317,719, issued on Apr. 19, 2016, which is hereby incorporated herein by reference in its entirety and for all purposes

BACKGROUND

Technical Field

Embodiments described herein relate to processors. In particular, embodiments described herein relate to the evaluation of hash algorithms with processors.

Background Information

Hash functions or algorithms are a type of cryptographic algorithm that are widely used in computer systems and other electronic devices. The hash algorithms generally take a message as an input, generate a corresponding hash value or digest by applying the hash function to the message, and output the hash value or digest. Typically, the same hash value should be generated if the same hash function is evaluated with the same message. Such hash algorithms are used for various purposes, such as for verification (e.g., verifying the integrity of files, data, or messages), identification (e.g., identifying files, data, or messages), authentication (e.g., generating message authentication codes), generating digital signatures, generating pseudorandom numbers, and the like. As one illustrative example, a hash function may be used to generate a hash value for a given message. At a later time, a hash value may be recomputed for the given message using the same hash function. If the hash values are identical, then it can be assumed that the message hasn't been changed. In contrast, if the hash values are different, then it can be assumed that the message has been changed.

One known type of hashing algorithm is the SM3 hash function. The SM3 hash algorithm has been published by the Chinese Commercial Cryptography Association Office and approved by the Chinese government. The SM3 hash algorithm has been specified as the hashing algorithm for the TCM (Trusted Computing Module) by the China Information Security Standardization Technical Committee (TC260) initiative. An English language description of the SM3 hash function has been published as the Internet Engineering Task Force (IETF) Internet-Draft entitled "SM3 Hash Function," by S. Shen and X. Lee, on Oct. 24, 2011.

BRIEF DESCRIPTION OF THE DRAWINGS

The invention may best be understood by referring to the following description and accompanying drawings that are used to illustrate embodiments. In the drawings:

FIG. 2 illustrates the compression function of the SM3 hash algorithm.

FIG. 7 is a block diagram illustrating an embodiment of an SM3 four message expansion initiation operation.

FIG. 8 is a block diagram illustrating an embodiment of an SM3 four message expansion completion operation.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

DETAILED DESCRIPTION OF EMBODIMENTS

Disclosed herein are SM3 hash algorithm acceleration instructions, processors to execute the instructions, methods performed by the processors when processing or executing the instructions, and systems incorporating one or more processors to process or execute the instructions. In the following description, numerous specific details are set forth (e.g., specific instruction operations, data formats, arrangement of data elements within operands, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
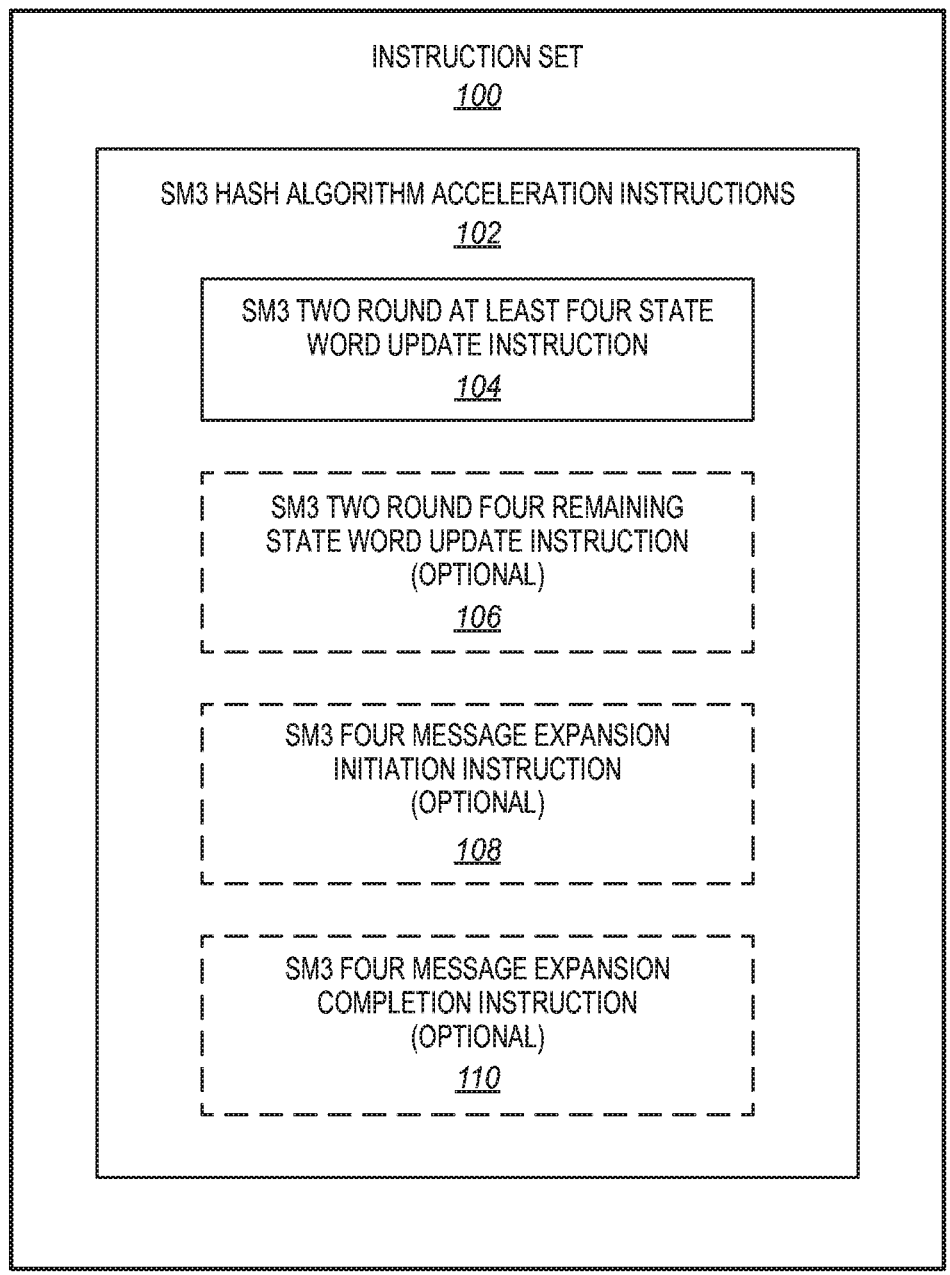
FIG. 1 is a block diagram of an instruction set of a processor that includes one or more SM3 hash algorithm acceleration instructions.

FIG. 1 is a block diagram of an instruction set 100 of a processor that includes one or more SM3 hash algorithm acceleration instructions 102. The SM3 acceleration instruction(s) may help to accelerate implementations of the SM3 hash algorithm. The instruction set is part of the instruction set architecture (ISA) of the processor and includes the native instructions that the processor is operative to perform. The instructions of the instruction set (e.g., including the SM3 acceleration instructions) represent macroinstructions, assembly language instructions, or machine-level instructions that are provided to the processor for execution. These instructions are contrasted to microinstructions, micro-ops, or other instructions that result from decoding the instructions of the instruction set.

In some embodiments, the SM3 acceleration instruction(s) 102 may include an SM3 two round at least four (or in some embodiments eight) state word update instruction 104. When performed, the SM3 two round state word update instruction 103 may be operable to cause the processor to update at least four (or in some embodiments eight) of the state words of the SM3 hash algorithm by two rounds.

In embodiments where the instruction 104 is optionally an SM3 two round four state word update instruction 104, the instructions 102 may optionally include an SM3 two round four remaining state word update instruction 106. When performed, the instruction 106 may be operable to cause the processor to update a remaining four of the eight state words (e.g., the four not updated by the instruction 104). Alternatively, these remaining four state words may optionally instead be updated by software (e.g., through a sequence of conventional instructions).

In some embodiments, the instruction(s) 102 may optionally include one or more instructions to assist with message scheduling, although this is not required. For example, in some embodiments, the instruction(s) 102 may optionally include an SM3 four message expansion initiation instruction 108. When performed, the instruction 108 may be operable to cause the processor to initiate and/or partially perform the expansion of four messages. In some embodiments, the instruction(s) 102 may optionally include an SM3 four message expansion completion instruction 110 designed to work with the initiation instruction 108. When performed, the instruction 110 may be operable to cause the processor to finish or complete the expansion of the four messages.

As shown, in some embodiments, the instruction set 100 may include four different SM3 hash function acceleration instructions 102. However, in other embodiments, only any single one, or a subset of any one or more of these instructions 102, may optionally be included in the instruction set 100. Although including all of the four instructions may tend to provide the greatest amount of acceleration, some acceleration may be achieved by including any one or more of these instructions.

FIG. 2 illustrates the compression function 212 of the SM3 hash algorithm suitable for embodiments. The SM3 hash algorithm accepts a message as input. The message may represent a bit string of arbitrary length. The SM3 hash algorithm performs a number of operations using the input message and generates a hash value or digest having a length of 256-bits after padding and iterative compression.

Initially, the 256-bit state value V(i) is partitioned into eight 32-bit state words A, B, C, D, E, F, G, and H. The initial state value V(0) for the first iteration is a constant defined by the SM3 hash algorithm. The state words A through H are specified in "Big Endian" format according to the algorithm but their format in an implementation may vary if desired.

An iterative procedure is then performed on the sequence of blocks. The SM3 hash algorithm includes sixty-four iterations or "rounds" (i.e., from j ranging from 0 to 63). As shown, a single round 213 includes a number of different operations. The leftward pointing arrow symbol (←) represents storing, assigning, or equating the value or parameter on the right to the value or parameter on the left. The symbol "<<<" represents a rotate operation. The symbol of the encircled plus sign (⊕) represents a logical exclusive OR (XOR) operation. $T_j$ is a constant having a value as specified in the SM3 hash function that depends on the iteration (i.e., the value of j). For example, $T_j$ may have value. The variables SS1, SS2, TT1, and TT2 are internal 79cc4519 for 0≤j≤15 and the value 7a879d8a for 16≤j≤63 intermediate values used in the iterations.

$FF_j$ is a Boolean function which varies with round number (j) according to Equation 1:

$$FF_j(X, Y, Z) = X \text{ XOR } Y \text{ XOR } Z \ (0 \leq j \leq 15); \text{ or}$$
$$(X \text{ AND } Y) \text{ OR } (X \text{ AND } Z)$$
$$\text{OR } (Y \text{ AND } Z) \ (16 \leq j \leq 63)$$

Equation 1

$GG_j$ is a Boolean function which varies with round number (j) according to Equation 2:

$$GG_j(X, Y, Z) = X \text{ XOR } Y \text{ XOR } Z \ (0 \leq j \leq 15); \text{ or}$$
$$= (X \text{ AND } Y) \text{ OR } (\text{NOT } X \text{ AND } Z) \ (16 \leq j \leq 63)$$

Equation 2

$P_0$ is a permutation function in compression function according to Equation 3:

$$P_0(X) = X \text{ XOR}(X <<< 9) \text{XOR}(X <<< 17)$$

Equation 3

Notice that the term $W_j$ is added to the evaluation of the Boolean function $GG_j$. Also, the term $W'_j$ is added to the evaluation of the Boolean function FF. The terms $W_j$ and $W'_j$ represent message terms, message inputs, or simply messages. For iterations 0 to 15, the terms $W_0$ to $W_{15}$ are obtained from the 512-bit block being compressed. In particular, the 512-bit message block being compressed is divided or partitioned into sixteen 32-bit words referenced in big-endian format as $W_0$ to $W_{15}$. The remaining messages $W_j$ and $W'_j$ are calculated during a message extension or message expansion portion of the SM3 hash algorithm.

The $W_j$ messages for iterations 16 to 67 may be calculated according to the following Equation 4:

$$W_j = P_1(W_{j-16} \text{XOR} W_{j-9} \text{XOR}(W_{j-3} <<< 15)) \text{XOR}$$
$$(W_{j-13} <<< 7) \text{XOR} W_{j-6}$$

Equation 4

In Equation 4, $P_1(X)$ is a permutation function for message expansion that is defined by the following Equation 5:

$$P_1(X) = X \text{ XOR}(X <<< 15) \text{XOR}(X <<< 23)$$

Equation 5

The $W_j$ messages for iterations 16 to 67 may be calculated according to Equation 4 with the permutation function $P_1$ according to Equation 5. Notice that the calculation of a $W_j$ message for a given round (e.g., round j) depend on messages from earlier rounds. In particular, as can be readily seen in Equation 4, the $W_j$ message for a given round (e.g., round j) depends on the prior round messages $W_{j-16}$, $W_{j-13}$, $W_{j-9}$, $W_{j-6}$, and $W_{j-3}$. $W_{j-3}$ is the message from three rounds back relative to round j, $W_{j-16}$ is the message from sixteen rounds back relative to round j, and so on.

The $W'_j$ messages may be calculated or derived from the $W_j$ messages according to the following Equation 6:

$$W'_j = W_j \text{ XOR } W_{j+4} \qquad \text{Equation 6}$$

Notice that the $W'_j$ message depends on the $W_j$ message from the same round as well as on the $W_{j+4}$ message from four rounds ahead. Since $W_0$ to $W_{15}$ are divided or obtained from the 512-bit message block being compressed, messages $W'_0$ to $W'_{11}$ may be determined using Equation 6 based on the initially known messages $W_0$ to $W_{15}$. The remaining messages $W'_{12}$ to $W'_{63}$ may be determined from messages $W_{16}$ to $W_{67}$, which may be calculated using Equations 4-5. Notice that Was to $W_{67}$ may be calculated, even though they are not input directly into the compression function, but are needed to calculate $W'_{60}$ to $W'_{63}$.

One challenge is that implementing the SM3 hash algorithm in processors generally tends to be computationally intensive. For example, as can be readily seen from FIG. 2 and Equations 1-3, updating the state words for each round involves a large number of different operations. Specifically, during each round a large number of XOR operation, rotate operations, and other operations typically need to be performed. In addition, there are a large number of rounds (e.g., 64-rounds). Conventionally, without the SM3 hash algorithm two round state word update instructions disclosed herein, updating the state words by two rounds of the algorithm generally tends to involve executing a large number of separate instructions. For example, conventionally it is possible that a separate instruction may be used for each XOR operation, for each rotate operation, etc. Additional instructions may also potentially be needed to move or rearrange data to prepare it for the next round. As a result, the performance of the rounds in software by separate more general-purpose instructions tends to be poor. This fact, compounded with the large number of rounds to be performed, generally tends to make the implementation of the SM3 hash algorithm very computationally intensive and/or take a significant amount of time.

Figure 3:
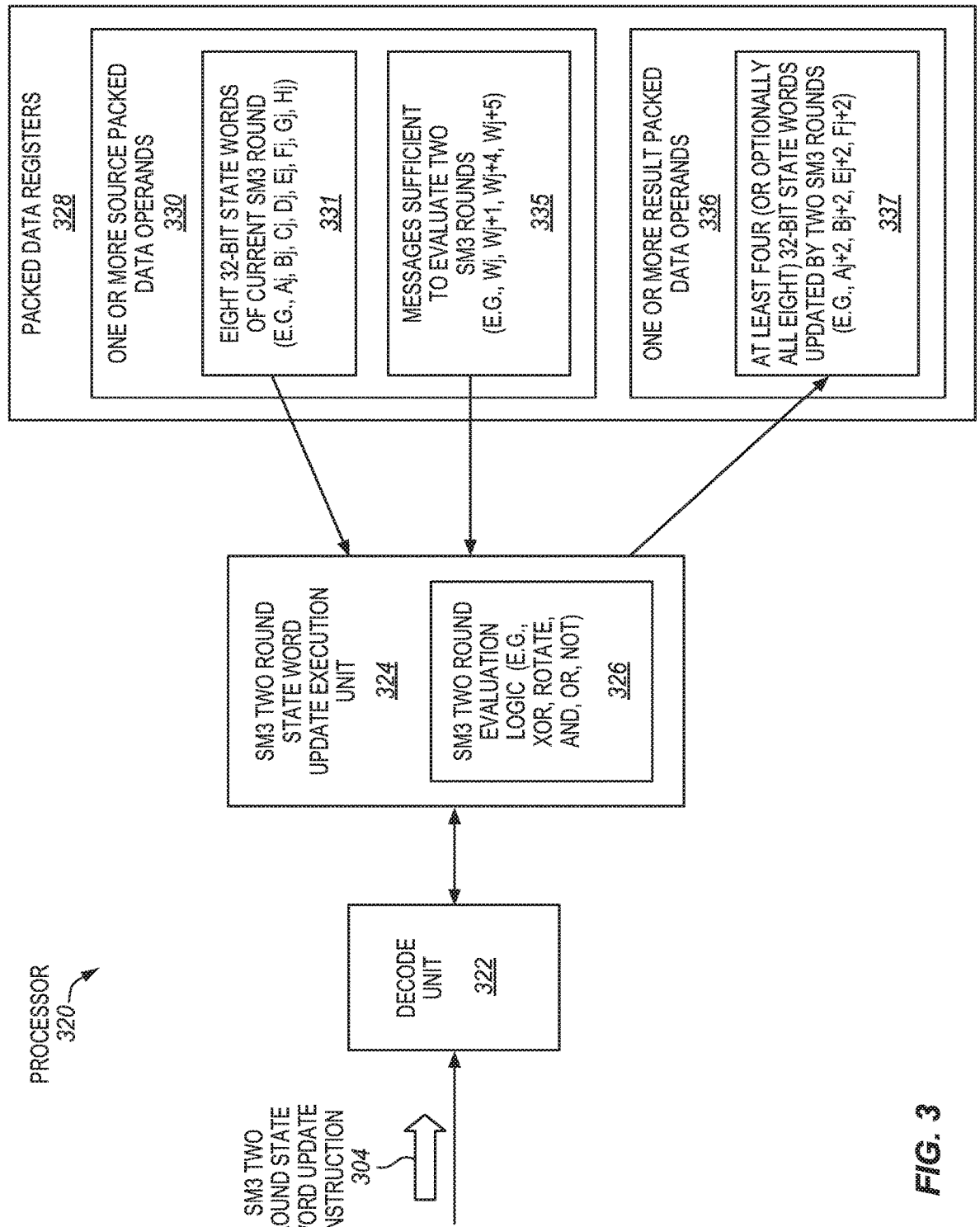
FIG. 3 is a block diagram of an embodiment of a processor that is operable to perform an embodiment of an SM3 two round at least four (or in some embodiments eight) state word update instruction.

FIG. 3 is a block diagram of an embodiment of a processor 320 that is operable to perform an embodiment of an SM3 two round at least four (or in some embodiments eight) state word update instruction 304. In some embodiments, the processor may be a general-purpose processor (e.g., a general-purpose microprocessor of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may be any of various complex instruction set computing (CISC) processors, reduced instruction set computing (RISC) processors, very long instruction word (VLIW) processors, hybrids thereof, other types of processors, or have a combination of such different processors (e.g., in different cores).

During operation, the processor 320 may receive the embodiment of the SM3 two round state word update instruction 304. For example, the instruction 304 may be received from an instruction fetch unit, an instruction queue, or the like. The instruction 304 may represent a macroinstruction, assembly language instruction, machine code instruction, or other instruction or control signal of an instruction set of the processor.

In some embodiments, the instruction 304 may explicitly specify (e.g., through one or more fields or a set of bits), or otherwise indicate (e.g., implicitly indicate, etc.), one or more source packed data operands 330. In some embodiments, the one or more source packed data operands 330 may have eight 32-bit state words to be input to a current SM3 round (j) 331 (e.g., $A_j$, $B_j$, $C_j$, $D_j$, $E_j$, $F_j$, $G_j$, $H_j$). In some embodiments, the one or more source packed data operands 330 may also have message information 335 (e.g., a set of messages) sufficient to evaluate the next two subsequent and sequential SM3 rounds apportioned among any desired number of source operands and in any desired order. As one example, this message information may include the four messages $W_j$, $W_{j+1}$, $W'_j$, $W'_{j+1}$. As another example, this message information may include the four messages $W_j$, $W_{j+1}$, $W_{j+1}$, $W_{j+5}$. Still other message information is possible, as will be apparent to those skilled in the arts and having the benefit of the present disclosure. These state words and messages may be apportioned among any desired number and size of one or more source operands and may be in any desired order. The scope of the invention is not particularly limited to the number of source packed data operands used to provide the input data, the sizes thereof, or to the arrangements of the data within the operands, although certain efficiencies and/or advantages may be achieved through certain arrangements of the data within the operands from an overall algorithmic perspective (e.g., by reducing operations to rearrange data elements for different iterations), as will be appreciated by those skilled in the arts and having the benefit of the present disclosure. The specific examples disclosed elsewhere herein are believed to be beneficial but are certainly not required.

In some embodiments, the instruction may also specify or otherwise indicate a round number (e.g., the current round j ranging from 0 to 63), such as, for example, by a data element in the one or more source packed data operands, a field of the instruction 304 (e.g., an immediate), a value in a general-purpose register (e.g., specified by or implicit to the instruction), or otherwise. In some embodiments, the instruction 304 may also explicitly specify (e.g., through one or more fields or a set of bits), or otherwise indicate (e.g., implicitly indicate, etc.), one or more destination storage locations where one or more result packed data operands 336 are to be stored in response to the instruction.

The processor 320 includes a set of packed data registers 328. Each of the packed data registers may represent an on-die storage location that is operable to store packed data, vector data, or SIMD data. The packed data registers may be implemented in different ways in different microarchitectures using well-known techniques and are not limited to any particular type of circuit. Examples of suitable types of registers include, but are not limited to, dedicated physical registers, dynamically allocated physical registers using register renaming, and combinations thereof.

As shown, in some embodiments, the one or more source packed data operands 330 may optionally be stored in one or more packed data registers 328. Similarly, in some embodiments, the one or more result packed data operands 336 may optionally be stored in one or more packed data registers 328. Alternatively, memory locations, or other storage locations, may be used for one or more of these operands. Moreover, although the source operand(s) 330 and result operand(s) 336 are shown as being separate in the illustration, in some embodiments, a packed data register or other storage location used for a source operand may be reused for a result operand (e.g., an instruction may implicitly indicate that a result packed data operand is to be written over a specified source packed data operand).

When one or more packed data registers are used to store the one or more source packed data operands, they generally need to be of sufficient size and/or number to store the associated operands. Generally, either a relatively greater number of smaller packed data registers may be used, or a relatively lesser number of larger packed data registers may be used, or a combination of both larger and smaller registers may be used. As previously mentioned, in some embodiments, the one or more source packed data operands 330 may have eight 32-bit state words of a current SM3 round 331 (e.g., $A_j$, $B_j$, $C_j$, $D_j$, $E_j$, $F_j$, $G_j$, $H_j$). In embodiments, the one or more source packed data operands 330 may also have message information 335, such as four 32-bit messages (e.g., either $W_j$, $W_{j+1}$, $W'_j$, $W'_{j+1}$; or $W_j$, $W_{j+1}$, $W_{j+4}$, $W_{j+5}$). Collectively, this includes a total of twelve 32-bit data elements and/or 384-bits of input data.

In some embodiments, three 128-bit packed data registers may be used to store this input data. In some embodiments, 128-bit packed data registers may be used even if a processor has wider packed data registers (e.g., 256-bit registers), such as, for example, to allow the instructions to be used on other processors without such wider registers. In other embodiments, one 256-bit register and one 128-bit register may be used to store this input data. In other embodiments, two 128-bit packed data registers and two 64-bit packed data registers may be used to store this input data. In still other embodiments, six 64-bit packed data registers may be used to store this input data. In still other embodiments, other combinations of 256-bit, 128-bit, 64-bit, or other sized registers (e.g., 32-bit, 512-bit, etc.) may optionally be used to store the one or more source packed data operands. In cases where relatively large numbers of registers are used (e.g., four to six or more), rather than having the instruction specify all registers (e.g., thereby increasing the instruction length), one or more registers may be specified and one or more sequential/next registers may be implicit to the instruction (e.g., to an opcode).

Referring again to FIG. 3, the processor includes a decode unit or decoder 322. The decode unit may receive and decode the instruction 304 and output one or more micro-instructions, micro-operations, micro-code entry points, decoded instructions or control signals, or other relatively lower-level instructions or control signals that reflect, represent, and/or are derived from the instruction 304. The one or more lower-level instructions or control signals may implement the higher-level instruction 304 through one or more lower-level (e.g., circuit-level or hardware-level) operations. In some embodiments, the decode unit may include one or more input structures (e.g., port(s), interconnect(s), an interface) to receive the instruction, an instruction recognition and decode logic coupled with the input structure to recognize and decode the instruction, and one or more output structures (e.g., port(s), interconnect(s), an interface) coupled with the instruction recognition and decode logic to output the one or more corresponding lower level instructions or control signals. The decode unit may be implemented using various different mechanisms including, but not limited to, microcode read only memories (ROMs), look-up tables, hardware implementations, programmable logic arrays (PLAs), and other mechanisms used to implement decode units known in the art. In some embodiments, instead of the instruction 304 being provided directly to the decode unit, it may be provided to an instruction emulator, translator, morpher, interpreter, or other instruction conversion module that may convert it into one or more other instructions to be decoded.

Referring again to FIG. 3, an SM3 hash function two round at least four state word update execution unit 324 is coupled with the decode unit 322 and the packed data registers 328. For simplicity, the unit 324 may also be referred to herein as an SM3 execution unit, or simply as an execution unit. The execution unit may receive the one or more decoded or otherwise converted instructions or control signals that represent and/or are derived from the instruction 304. The execution unit may also receive the one or more source packed data operand(s) 330 indicated by the instruction 304. The execution unit is operable in response to and/or as a result of the instruction 304 (e.g., in response to one or more instructions or control signals decoded from the instruction) to store the one or more result packed data operand(s) 336 in one or more corresponding destination storage location(s) indicated by the instruction 304.

In some embodiments, the one or more result packed data operand(s) 336 may have at least four two-round updated 32-bit state words updated by two SM3 rounds relative to a given round corresponding to the one or more source packed data operands 330. For example, in one embodiment, the result operand(s) 336 may include $A_{j+2}$, $B_{j+2}$, $E_{j+2}$, and $F_{j+2}$ apportioned among any desired number of operands and in any desired order. $A_{j+2}$, $B_{j+2}$, $E_{j+2}$, and $F_{j+2}$, respectively, are updated by two SM3 rounds relative to $A_j$, $B_j$, $E_j$, and $F_j$. In some embodiments, the result operand(s) 336 may optionally have at least eight 32-bit state words updated by the two SM3 rounds (e.g., $A_{j+2}$, $B_{j+2}$, $C_{j+2}$, $D_{j+2}$, $E_{j+2}$, $F_{j+2}$, $G_{j+2}$, and $H_{j+2}$) apportioned among any desired number of operands and in any desired order, although this is not required. In some embodiments, the execution unit 324 in response to the instruction 304 may store any of the results shown and described for FIG. 5, including the described variations and alternatives thereof, although the scope of the invention is not so limited. Advantageously, the SM3 two round state word update instruction may significantly help to increase the speed, efficiency, and/or performance of implementing the SM3 message generation (e.g., by avoiding an otherwise high instruction count and complexity through conventional software approaches).

In some embodiments, the execution unit may perform all operations of a round for each of the two rounds (e.g., the operations shown for single round 213). Alternatively, certain of these operations may optionally be omitted. For example, in the case of a four state word update instruction, certain operations that would be needed to generate the remaining four state words may optionally be omitted (e.g., operations to generate $C_{j+2}$, $D_{j+2}$, $G_{j+2}$, $H_{j+2}$ in the second round may optionally be omitted). As another example, certain operations may optionally be performed outside of the confines of the execution of the instruction/operation. For example, $A_j <<< 12$ may optionally be performed by a separate instruction, $T <<< j$ may optionally be performed by a separate instruction, etc. Moreover, it is to be appreciated that the particular illustrated operations shown for the round 213 need not necessarily be performed for the rounds. For example, certain optionally may optionally be implemented by one or more computationally equivalent substitute operations. For example, XORs could be implemented by a combination of other Boolean operations, rotates could be implemented by bit extraction operations, etc. It is to be appreciated that use of the terms "two rounds," "two round state word update instructions," and like terms herein, encompass and allow for such possibilities.

Collectively, the one or more result packed data operands may include a total of either four 32-bit data elements or 128-bits (e.g., in the case of four state elements updated) or eight 32-bit data elements or 256-bits (e.g., in the case of eight state elements updated). In some embodiments, one 128-bit packed data register may be used to store four 32-bit state words updated by two rounds, or two 128-bit packed data registers may be used to store eight 32-bit state words updated by two rounds. In other embodiments, two 64-bit packed data registers may be used to store four 32-bit state words updated by two rounds, or four 64-bit packed data registers may be used to store eight 32-bit state words updated by two rounds. In still other embodiments, a 256-bit packed data register may be used to store either four or eight 32-bit state words updated by two rounds. In still other embodiments, other combinations of 256-bit, 128-bit, 64-bit, or other sized registers (e.g., 32-bit, 512-bit, etc.) may optionally be used to store the one or more source packed data operands. Alternatively, memory locations or other storage locations may optionally be used, if desired. The scope of the invention is not particularly limited to the number of result operands, the sizes thereof, or to the arrangement of the data in the result operands, although certain efficiencies and/or advantages may be achieved through certain arrangements of the data within the result operands from an overall algorithmic perspective (e.g., by reducing operations to rearrange data elements for different iterations), as will be appreciated by those skilled in the arts and having the benefit of the present disclosure. The specific examples disclosed elsewhere herein are believed to be beneficial but are certainly not required.

Referring again to FIG. 3, the execution unit 324 and/or the processor 320 may include specific or particular logic (e.g., transistors, integrated circuitry, or other hardware potentially combined with firmware (e.g., instructions stored in non-volatile memory) and/or software) that is operable to perform the instruction 304 and/or store the result in response to and/or as a result of the instruction 304 (e.g., in response to one or more instructions or control signals decoded or otherwise derived from the instruction 304). In some embodiments, the circuitry or logic may include SM3 two round evaluation logic 326, such as, for example, XOR logic, rotate logic, AND logic, OR logic, NOT logic, etc.

In some embodiments, to help avoid unduly increasing die area and/or power consumption, some of the hardware or other logic used to implement the SM3 two round state word update instruction, or other instructions disclosed herein, may optionally be reused to implement one or more other encryption instructions, such as, for example, those used to implement a Secure Hash Algorithm (e.g., SHA-2). For example, in some embodiments, hardware or logic used to implement the Boolean functions $FF_j$ (e.g., for when j>15) and $GG_j$ (e.g., for when j>15) may optionally be reused to implement the counterpart Maj (majority) and Ch (choose) functions of SHA-2. As another example, in some embodiments, hardware or logic used to perform additions in SM3 (e.g., one or more adders) may optionally be reused to implement additions in SHA-2. Some XOR and rotate logic may also optionally be reused.

To avoid obscuring the description, a relatively simple processor 320 has been shown and described. In other embodiments, the processor may optionally include other well-known processor components. Possible examples of such components include, but are not limited to, an instruction fetch unit, instruction and/or data L1 caches, second or higher level caches (e.g., an L2 cache), an instruction scheduling unit, a register renaming unit, a reorder buffer, a retirement unit, a bus interface unit, instruction and data translation lookaside buffers (TLBs), other components included in processors, and various combinations thereof.

Figure 4:
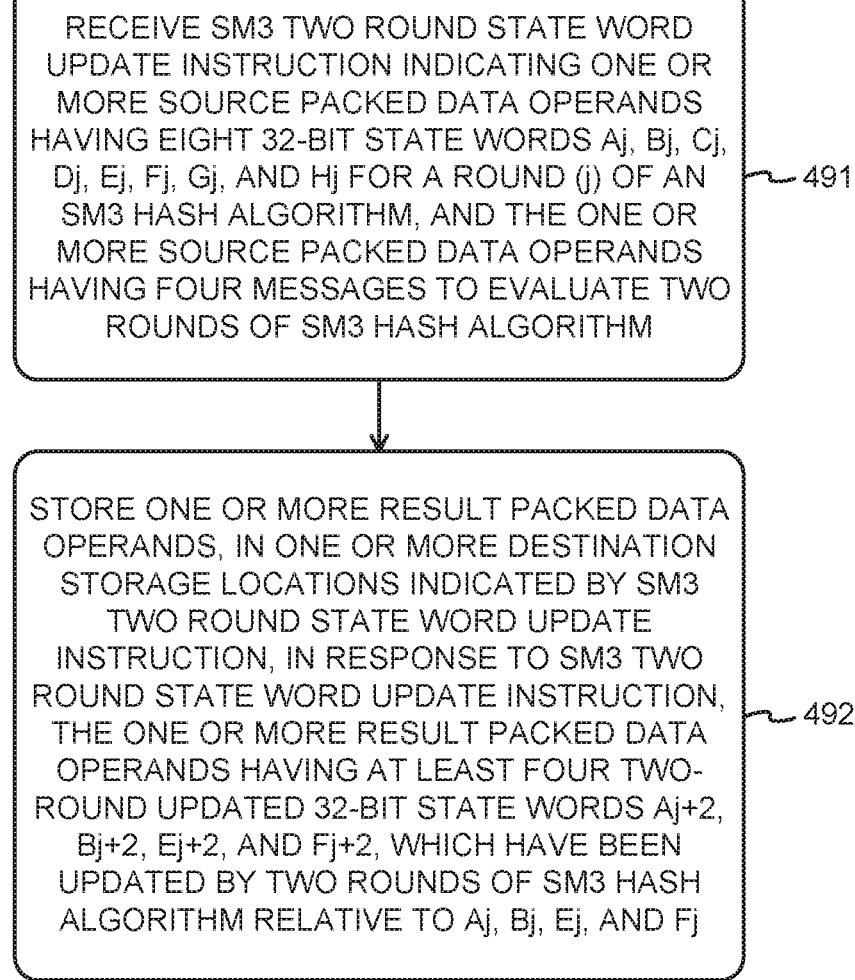
FIG. 4 is a block flow diagram of an embodiment of a method of performing an embodiment of an SM3 two round at least four (or in some embodiments eight) state word update instruction.

FIG. 4 is a block flow diagram of an embodiment of a method 490 of performing an SM3 two round at least four (or in some embodiments eight) state word update instruction. In some embodiments, the operations and/or method of FIG. 4 may be performed by and/or within the processor of FIG. 3. The components, features, and specific optional details described herein for the processor of FIG. 3, also optionally apply to the operations and/or method of FIG. 4. Alternatively, the operations and/or method of FIG. 4 may be performed by and/or within a similar or different apparatus. Moreover, the processor of FIG. 3 may perform operations and/or methods the same as, similar to, or different than those of FIG. 4.

The method includes receiving the SM3 two round state word update instruction, at block 491. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The SM3 two round state word update instruction may specify or otherwise indicate one or more source packed data operands. The one or more source packed data operands may have eight 32-bit state words $A_j$, $B_j$, $C_j$, $D_j$, $E_j$, $F_j$, $G_j$, and $H_j$ for a round (j) of an SM3 hash algorithm. The one or more source packed data operands may also have four messages that are sufficient to evaluate two rounds of the SM3 hash algorithm.

One or more result packed data operands may be stored, in one or more destination storage locations indicated by the instruction, in response to and/or as a result of the instruction, at block 492. Representatively, an execution unit, instruction processing apparatus, or processor may perform the instruction and store the result. In some embodiments, the one or more result packed data operands having at least four two-round updated 32-bit state words $A_{j+2}$, $B_{j+2}$, $E_{j+2}$, and $F_{j+2}$, which have been updated by the two rounds of the SM3 hash algorithm relative to $A_j$, $B_j$, $E_j$, and $F_j$. In some embodiments, the method may optionally include receiving any of the source operands and storing any of the results shown in FIG. 5, including the variations and alternatives mentioned therefor, although the scope of the invention is not so limited.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. The microarchitectural operations to implement the instruction may optionally include any of the operations of an SM3 round (e.g., round 213).

Figure 5:
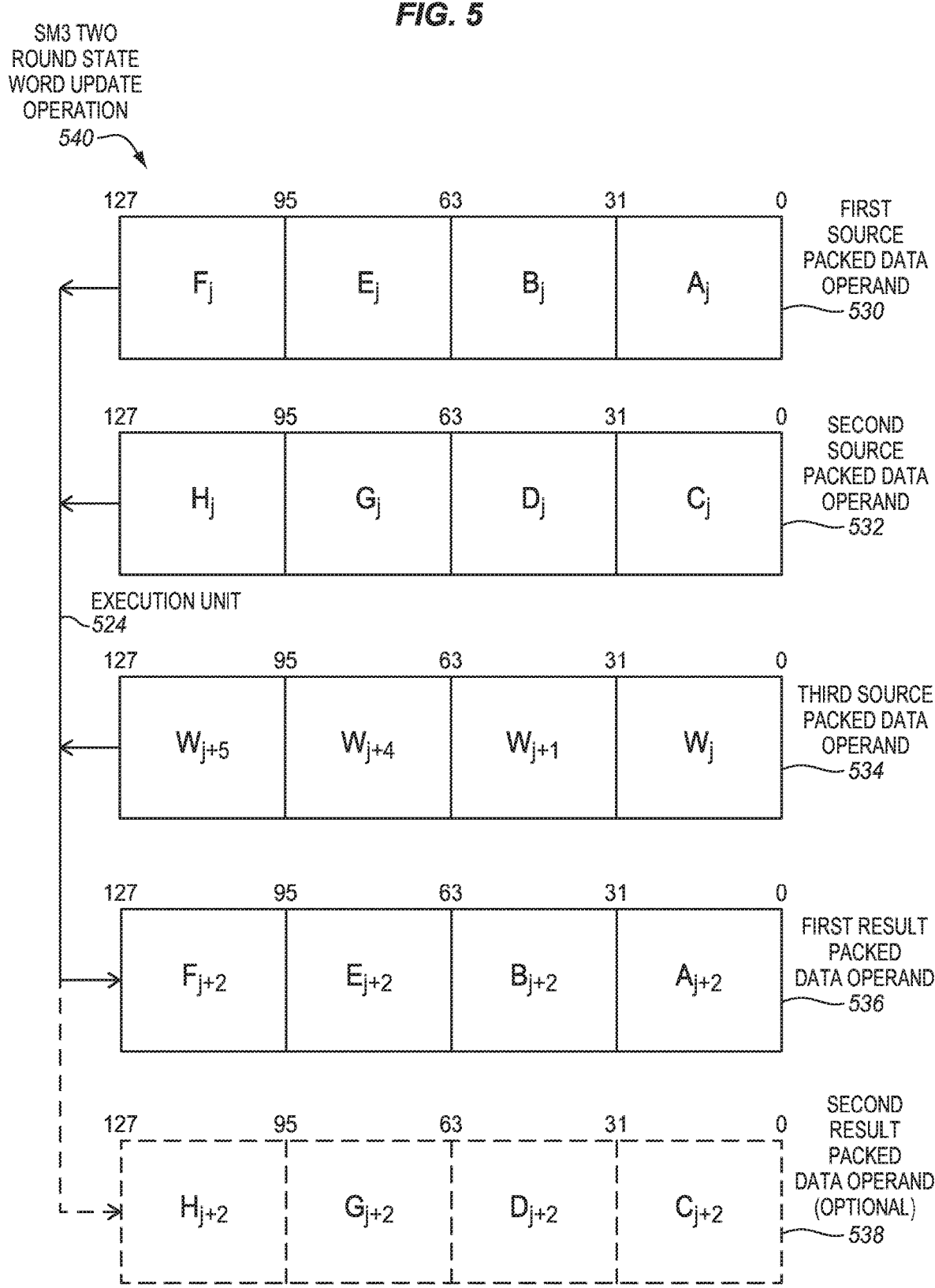
FIG. 5 is a block diagram illustrating an embodiment of an SM3 two round eight state word update operation.

FIG. 5 is a block diagram illustrating an embodiment of an SM3 two round state word update operation 540 that may be performed in response to an embodiment of an SM3 two round state word update instruction. In the illustrated embodiment, the instruction specifies or otherwise indicates a first 128-bit source packed data operand 530, a second 128-bit source packed data operand 532, and a third 128-bit source packed data operand 534. The use of 128-bit operands may offer certain advantages, for example allowing use of the instructions in processors that have 128-bit packed data registers but not 256-bit packed data registers, but is not required. In other embodiments, different numbers and sizes of operands may optionally be used (e.g., 64-bit operands, 256-bit operands, a combination of different sizes, etc.).

In the illustrated embodiment, the first 128-bit source packed data operand 530 has a first four 32-bit state words for input to the current round (j), and the second 128-bit source packed data operand 532 has a second four 32-bit state words for input to the current round (j). Specifically, in the illustrated embodiment, the first source operand 530 has, from a least significant bit position on the right to a most significant bit position on the left, the 32-bit state element $A_j$ in bits [31:0], $B_j$ in bits [63:32], $E_j$ in bits [95:64], and $F_j$ in bits [127:96]. In other embodiments, a reverse order may also optionally be used. The second source operand 532 has, also from a least significant bit position on the right to a most significant bit position on the left, the 32-bit state elements $C_j$ in bits [31:0], $D_j$ in bits [63:32], $G_j$ in bits [95:64], and $H_j$ in bits [127:96]. In other embodiments, a reverse order may also optionally be used. The illustrated arrangement may offer certain advantages, but is not required. In other embodiments, the eight 32-bit state words may be rearranged variously among the available source operands.

The illustrated third source packed data operand 534 has message information (e.g., a set of four messages) sufficient to evaluate two SM3 rounds. Specifically, the illustrated third source packed data operand 534 has the four messages $W_j$, $W_{j+1}$, $W_{j+4}$, and $W_{j+5}$. The messages $W_{j+4}$ and $W_j$ are sufficient to calculate the message $W'_j$ according to Equation 6. Similarly, the messages $W_{j+5}$ and $W_{j+1}$ are sufficient to calculate the message $W'_{j+1}$ according to Equation 6. In another embodiment, the instruction may indicate one or more source operands providing the four messages $W_j$, $W_{j+1}$, $W'_j$, and $W'_{j+1}$. In still other embodiments, other combinations of messages may be used as long as the needed messages for two rounds are either provided or can be calculated or derived from the information provided (e.g., $W_j$, $W_{j+1}$, $W'_j$, $W_{j+5}$).

Referring again to FIG. 5, a first result packed data operand 536 may be generated (e.g., by an execution unit 524) and stored in a destination storage location in response to the SM3 two round state word update instruction. The destination storage location may be specified or otherwise indicated by the instruction. In various embodiments, the destination storage location may be a packed data register, a memory location, or other storage location. In some embodiments, the first result packed data operand 536 may include four 32-bit state words updated by two SM3 rounds. For example, in the illustrated embodiment, the first result packed data operand 536 has, the 32-bit state elements $A_{j+2}$ in bits [31:0], $B_{j+2}$ in bits [63:32], $E_{j+2}$ in bits [95:64], and $F_{j+2}$ in bits [127:96]. In other embodiments, a reverse order may also optionally be used. Moreover, although the illustrated arrangement may offer certain advantages, in other embodiments, the state words may optionally be rearranged variously within the operand.

In some embodiments, in the optional case of an SM3 two round eight state word update instruction, a second result packed data operand 538 may be generated and stored in a second destination storage location in response to the instruction. The second destination storage location may be specified or otherwise indicated by the instruction. In various embodiments, the second destination storage location may be a packed data register, a memory location, or other storage location. In some embodiments, the second result packed data operand 538 may include the remaining four 32-bit state words, which were not included in the first result packed data operand 536, which have been updated by two SM3 rounds. Specifically, in the illustrated embodiment, the second result packed data operand 538 has, the 32-bit state elements $C_{j+2}$ in bits [31:0], $D_{j+2}$ in bits [63:32], $G_{j+2}$ in bits [95:64], and $H_{j+2}$ in bits [127:96]. In other embodiments, a reverse order may also optionally be used. Moreover, although the illustrated arrangement may offer certain advantages, various inter-operand and intra-operand rearrangements are contemplated.

Notice that, in some embodiments, the first result packed data operand 536 may optionally include the same corresponding type of state words (e.g., A, B, E, F) as the first source packed data operand 530, and in the same order. Also, in some embodiments, the second result packed data operand 538 may optionally include the same corresponding type of state words (e.g., C, D, G, H) as the second source packed data operand 532, and in the same order. This is not required, but may tend to provide certain efficiencies and/or advantages from an overall algorithmic perspective (e.g., by making management of the state words between rounds more efficient).

The second result packed data operand 538 of FIG. 5 is optional not required. In other embodiments, in the optional case of an SM3 two round four state word update instruction/operation, the first result packed data operand 536 (e.g., $A_{j+2}$, $B_{j+2}$, $E_{j+2}$, $F_{j+2}$ in any desired order) may be stored, but not second result packed data operand 538 (e.g., not $C_{j+2}$, $D_{j+2}$, $G_{j+2}$, $H_{j+2}$). Notice that one of the source operands includes $A_j$, $B_j$, $E_j$, and $F_j$, and the other source operand includes $C_j$, $D_j$, $G_j$, and $H_j$. This particular grouping of these types of state words within the same operands offers an advantage when only four state words are updated by two rounds (e.g., $A_{j+2}$, $B_{j+2}$, $E_{j+2}$, $F_{j+2}$ generated). As will be explained further below (e.g., in conjunction with FIG. 6), the other four state words updated by two rounds (e.g., $C_{j+2}$, $D_{j+2}$, $G_{j+2}$, $H_{j+2}$) may be readily generated from $A_j$, $B_j$, $E_j$, and $F_j$, such as, for example, by software or by an additional SM3 acceleration instruction (e.g., instruction 106 and/or instruction described for FIG. 6). The particular illustrated grouping of the different-typed state words among the operands offers less advantage when all eight state words are updated by two rounds by performing a single instruction. In such cases, although some arrangements may tend to offer more efficient management of state words between rounds, almost any intra-operand and/or inter-operand rearrangement of the differently-typed state words is possible. For example, it may still be beneficial to maintain the same order of the differently-typed state words in the source and result operands.

In some embodiments, for example when only four state words are updated by two rounds (e.g., $A_{j+2}$, $B_{j+2}$, $E_{j+2}$, $F_{j+2}$), these updated four state words may optionally be written over four differently-typed state words in one of the source operands, although this is not required. For example, $A_{j+2}$, $B_{j+2}$, $E_{j+2}$, $F_{j+2}$ may be written over $C_{j+2}$, $D_{j+2}$, $G_{j+2}$, $H_{j+2}$ instead of over $A_j$, $B_j$, $E_j$, $F_j$). For example, the instruction may have a source/destination operand that is explicitly specified once, but is implicitly understood to be used as both a source operand and subsequently as a destination operand. Writing $A_{j+2}$, $B_{j+2}$, $E_{j+2}$, $F_{j+2}$ over $C_j$, $D_j$, $G_j$, $H_j$ instead of over $A_j$, $B_j$, $E_j$, $F_j$ may offer an advantage, for example when it's desired not to have another specified or implicitly indicated operand storage location, of preserving $A_j$, $B_j$, $E_j$, $F_j$ so that they may be used to update the remaining four state words by two rounds (e.g., $C_{j+2}$, $D_{j+2}$, $G_{j+2}$, $H_{j+2}$). For example, an additional SM3 acceleration instruction may be used (see e.g., FIG. 6), or this may be done in software.

One particular example embodiment of an SM3 two round four state word update instruction is the following SM3RNDS2 instruction. SRC represents a first 128-bit source operand, DST represents a second 128-bit source/destination operand (one location is specified and use as both a source and again as a destination is implicit to instruction), <XMM0> represents a third 128-bit source operand whose location is implicit to the instruction instead of being explicitly specified, and imm represents an immediate (e.g., an 8-bit immediate) to specify the round number (j). In other embodiments <XMM0> may be substituted for another 128-bit register.

SM3RNDS2 DST, SRC, imm, <XMM0>
j=imm
[$C_j$, $D_j$, G, $H_j$]=DST
[$A_j$, $B_j$, $E_j$, $F_j$]=SRC
[$W_{j+5}$, $W_{j+4}$, $W_{j+1}$, $W_j$]=XMM0

In response to the SM3RNDS2 instruction, a processor and/or an execution unit may perform the following operations, or their equivalent, or at least generate a result consistent with these operations:

If (j<16), then $T_j$=0x79cc4519, else $T_j$=0x7a879d8a, endif
SS1=(($A_j$<<<12)+$E_j$+($T_j$<<<j))<<<7
SS2=SS1 XOR ($A_j$<<<12)
TT1=$FF_j$($A_j$,$B_j$,$C_j$)+$D_j$+SS2+($W_j$ XOR $W_{j+4}$)
TT2=$GG_j$($E_j$,$F_j$,$G_j$)+$H_j$+SS1+$W_j$
$D_{j+1}$=$C_j$
$C_{j+1}$=$B_j$<<<9
$B_{j+1}$=$A_j$
$A_{j+1}$=TT1
$H_{j+1}$=$G_j$
$G_{j+1}$=$F_j$<<<19
$F_{j+1}$=$E_j$
$E_{j+1}$=P0(TT2)
SS1=(($A_{j+1}$<<<12)+$E_{j+1}$+($T_j$<<<(j+1)))<<<7
SS2=SS1 XOR (A+<<<12)
TT1=$FF_{j+1}$($A_{j+1}$,$B_{j+1}$,$C_{j+1}$)+$D_{j+1}$+SS2+($W_{j+1}$ XOR $W_{j+5}$)
TT2=$GG_j$+($E_{j+1}$,$F_{j+1}$,$G_{j+1}$)+$H_{j+1}$+SS1+$W_{j+1}$
$B_{j+2}$=$A_{j+1}$
$A_{j+2}$=TT1
$F_{j+2}$=$E_{j+1}$
$E_{j+2}$=P0(TT2)
DST=[$A_{j+2}$, $B_{j+2}$, $E_{j+2}$, $F_{j+2}$]

Notice that, for the second round, it is not required to calculate $C_{j+2}$, $D_{j+2}$, $G_{j+2}$, $H_{j+2}$ and these calculations may optionally be omitted if desired from the second round. Accordingly, two full rounds need not be performed, and it is to be appreciated that reference herein to two rounds encompasses such operations optionally be removed from the second of the two rounds.

It is to be appreciated that this is just one illustrative example. Other embodiments may use different numbers and sizes of operands, as previously described. Moreover, other embodiments may rearrange the elements variously within the operands. Both inter-operand and intra-operand rearrangements are possible. In addition, it is not required to use implicit reuse of a SRC/DST register, or to use an implicit register (e.g., <XMM0>). For example, the architecture may allow the operands to be specified explicitly, implicit subsequent registers may be used, etc.

Figure 6:
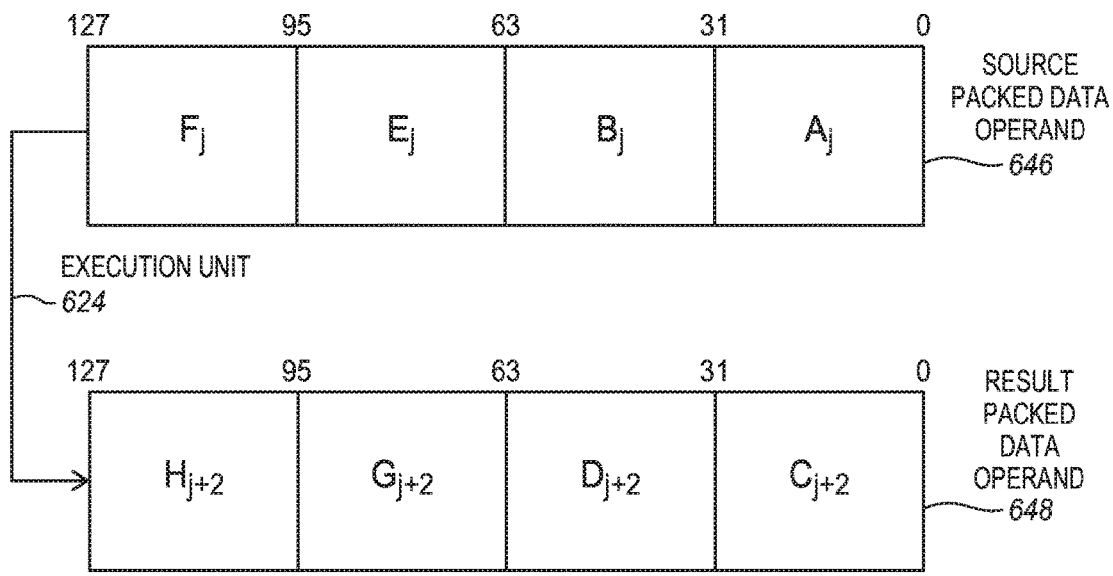
FIG. 6 is a block diagram illustrating an embodiment of an SM3 two round four remaining state word update operation.

FIG. 6 is a block diagram illustrating an embodiment of an SM3 two round four remaining state word update operation 644 that may be performed in response to an embodiment of an SM3 two round four remaining state word update instruction. In the illustrated embodiment, the instruction specifies or otherwise indicates a source packed data operand 646. As shown, in some embodiments, the source packed data operand may be a 128-bit operand. Alternatively, two 64-bit operands, a 256-bit operand, or other sized operands may optionally be used instead. In some embodiments, the source packed data operand may have four state words to be input to the current round (j) as input. For example, in the illustrated embodiment, the source packed data operand has, from a least significant bit position on the right to a most significant bit position on the left, the 32-bit state elements $A_j$ in bits [31:0], $B_j$ in bits [63:32], $E_j$ in bits [95:64], and $F_j$ in bits [127:96]. In other embodiments, these elements may be apportioned among any desired number of source operands and in any desired order within the source operand(s). For example, a reverse order within the operand may optionally be used. Moreover, in still other embodiments, the state words may optionally be rearranged variously within a single source operand or two source operands. In one aspect, the source packed data operand 646 may be the same operand/data as the first source packed data operand 530 of FIG. 5 (e.g., the operand/data may be reused by the algorithm).

A result packed data operand 648 may be generated (e.g., by an execution unit 624) and stored in a destination storage location in response to the instruction/operation.

The destination storage location may be specified or otherwise indicated by the instruction. In various embodiments, the destination storage location may be a packed data register, a memory location, or other storage location. As shown, in some embodiments, the result packed data operand may be a 128-bit operand. Alternatively, two 64-bit operands, a 256-bit operand, or other sized operands may optionally be used.

In some embodiments, the result packed data operand 648 may include the four remaining state words updated by two rounds. In one aspect, the four remaining state words may represent those not included in the first result packed data operand 536 stored in response to an SM3 two round four state word update instruction. In another aspect, the four remaining state words may represent the four types of state words (e.g., C, D, G, and H-types) not included in the source packed data operand 646 (e.g., A, B, E, and F-types). As shown, in the illustrated embodiment, the result packed data operand 648 has, the 32-bit state elements $C_{j+2}$ in bits [31:0], $D_{j+2}$ in bits [63:32], $G_{j+2}$ in bits [95:64], and $H_{j+2}$ in bits [127:96]. In other embodiments, a reverse order may optionally be used.

Moreover, although the illustrated arrangement may offer certain advantages, in still other embodiments, the state words may optionally be rearranged variously within the result packed data operand.

In some embodiments, a processor and/or the execution unit 624 may perform the following equations to generate $C_{j+2}$, $D_{j+2}$, $G_{j+2}$ and $H_{j+2}$, respectively, from $A_j$, $B_j$, $E_j$ and $F_j$ (provided in the source operand):

$C_{j+2}$=$B_{j+1}$=$A_j$<<<9
$D_{j+2}$=$C_{j+1}$=$B_j$<<<9
$G_{j+2}$=$F_{j+1}$<<<19=$E_j$<<<19
$H_{j+2}$=G+i=$F_j$<<<19

These relations can be readily derived from comparing the equalities for two rounds of the SM3 algorithm as shown in FIG. 2.

Recall that, as discussed above for FIG. 2 and Equations 4-6, the SM3 algorithm utilizes messages ($W_j$). Messages $W_0$ to $W_{15}$ are obtained from the 512-bit block being compressed. The remaining messages are calculated based on Equations 4-6. Conventionally, the message expansion generally tends to involve executing a large number of separate instructions. For example, conventionally it is possible that a separate instruction may be used for each XOR operation, for each rotate operation, etc.

Additional instructions may also potentially be needed to move or rearrange data to prepare it for expanding more messages. In addition, a large number of such $W_j$ messages need to be generated (e.g., $W_{16}$ to $W_{67}$). As a result, the performance of the rounds in software by separate more general-purpose instructions tends to be poor and/or take a significant amount of time.

In some embodiments, a pair of instructions to accelerate SM3 message expansion (e.g., instructions 108, 110) may be included in an instruction set of a processor. In some embodiments, the instructions may be used to generate four new messages (e.g., messages $W_{j+16}$, $W_{j+17}$, $W_{j+18}$, and $W_{j+19}$) corresponding to four sequential and consecutive rounds. The pair of instructions may be included whether or not the instruction set also includes an SM3 two round at least four state word update instruction (e.g., instruction 104).

In some embodiments, the source operands of the pair of instructions may collectively include a set of messages sufficient to generate the four new messages. The set of input messages needed to generate these four new messages are shown in the following four instances of Equation 4, as follows:

$W_{j+16}$=P1($W_j$ XOR $W_{j+7}$ XOR ($W_{j+13}$<<<15)) XOR ($W_{j+3}$<<<7) XOR $W_{j+10}$
$W_{j+17}$=P1($W_{j+1}$ XOR $W_{j+8}$ XOR ($W_{j+14}$<<<15)) XOR ($W_{j+4}$<<<7) XOR $W_{j+11}$
$W_{j+18}$=P1($W_{j+2}$ XOR $W_{j+9}$ XOR ($W_{j+15}$<<<15)) XOR ($W_{j+5}$<<<7) XOR $W_{j+12}$
$W_{j+19}$=P1($W_{j+3}$ XOR $W_{j+10}$ XOR ($W_{j+16}$<<<15)) XOR ($w_{j+6}$<<<7) XOR $W_{j+13}$

Sixteen unique messages are needed to evaluate these relations for the four new messages (e.g., $W_j$ through $W_{j+15}$). In addition, the message $W_{j+16}$ needs to be calculated to complete the calculation of $W_{j+19}$. $W_j$ corresponds to the oldest round to be input to round j, $W_{j+1}$ corresponds to the next oldest round to be input to round (j+1), and so on.

In one embodiment, all sixteen unique messages (e.g., $W_j$ to $W_{j+15}$) may optionally be included in the source operand(s) of one single instruction. The one single instruction may be operable to cause the processor to store all four updated messages (e.g., $W_{j+16}$ to $W_{j+19}$) within the confines of the execution of that single instruction. In other embodiments, a pair of instructions may be used, and the sixteen unique messages (e.g., $W_j$ to $W_{j+15}$) may be collectively included in the source operand(s) of the pair of instructions. The pair of instructions in cooperation may be operable to cause the processor to store all four updated messages (e.g., $W_{j+16}$ to $W_{j+19}$) within the confines of the execution of the pair of instructions. Each of the two instructions may provide only a subset of the needed input messages through its corresponding source operand(s). A first/initial instruction of the pair may generate temporary results that are further processed by the second/subsequent instruction to generate the four new messages.

Using a pair of instructions, instead of a single instruction, may offer certain potential advantages, for example, allowing the use of smaller registers and/or a smaller number of source operands than would be needed to provide all needed input messages in the source operand(s) of one single instruction.

FIGS. 7-8 illustrate operations for an embodiment of a pair of SM3 message expansion instructions. The instructions may be received, decoded, an execution unit may be enabled to perform the operations, etc., as previously described. FIG. 7 is a block diagram illustrating an embodiment of an SM3 four message expansion initiation operation 750 that may be performed in response to an embodiment of an SM3 four message expansion initiation instruction (e.g., a first instruction of the pair to be performed). In the illustrated embodiment, the instruction specifies or otherwise indicates a first 128-bit source packed data operand 752, a second 128-bit source packed data operand 754, and a third 128-bit source packed data operand 756. As before, the use of 128-bit operands may offer certain advantages, but is not required. In other embodiments, different numbers and sizes of operands may optionally be used, such as, for example, 64-bit operands, 256-bit operands, a combination of different sized operands, etc.

The first, second, and third source operands may be used to provide only a subset of the sixteen different input messages needed to evaluate the four new messages. In one aspect, the messages provided may represent those sufficient to evaluate a piece or portion of each of the four instances of Equation 4 shown immediately above. For example, in the illustrated example embodiment, the first source operand 752 has, the messages $W_j$ in bits [31:0], $W_{j+1}$ in bits [63:32], $W_{j+2}$ in bits [95:64], and $W_{j+3}$ in bits [127:96]. The second source operand 754 has, the messages $W_{j+13}$ in bits [31:0], $W_{j+14}$ in bits [63:32], $W_{j+15}$ in bits [95:64], and a do-not-care value (*) in bits [127:96]. The do-not-care value (*) may represent various convenient values, such as, for example, all zeroes, all ones, existing/unchanged bit values, etc. The third source operand 756 has, the messages $W_{j+7}$ in bits [31:0], $W_{j+8}$ in bits [63:32], $W_{j+9}$ in bits [95:64], and $W_{j+10}$ in bits [127:96].

In the illustrated embodiment, the first source operand 752 optionally has four messages corresponding to four consecutive rounds, and optionally arranged according to round order (e.g., ascending round order with increasing bit significance). Likewise, the second source operand 754 optionally has three messages corresponding to three consecutive rounds, and optionally arranged according to round order (e.g., ascending round order). Similarly, the third source operand 756 optionally has four messages corresponding to four consecutive rounds, and optionally arranged according to (e.g., ascending) round order. In another embodiment, a reverse or reflected order of the messages within in the operands may optionally be used if desired (e.g., the messages may be arranged in descending order within each of the operands). Storing messages for adjacent rounds within the same operand, storing messages for adjacent rounds in round order within the operands, and storing the adjacent messages of each of the operands in the same round order (e.g., all arranged in ascending round order), may help to increase the efficiency of managing the rearrangement of messages between rounds, but is not required. In other embodiments, the messages may optionally be rearranged through various intra-operand and/or inter-operand rearrangements. Moreover, in other embodiments, other numbers and/or sizes of operands may optionally be used, if desired.

Referring again to FIG. 7, a result packed data operand 758 may be generated (e.g., by an execution unit 724) and stored in a destination storage location in response to the SM3 four message expansion initiation instruction/operation. The destination storage location may be specified or otherwise indicated by the instruction. The destination storage location may be a packed data register, a memory location, or other storage location. In some embodiments, the result packed data operand 758 may include four temporary or intermediate results, for example, each representing a different evaluated piece/portion of a corresponding one of the four instances of Equation 4 shown immediately above. As used herein, an evaluated piece/portion means a value consistent with an evaluated piece/portion not necessarily that each operation shown in the equations be performed or even that those equations are actually used. For example, in other embodiments, computationally equivalent equations or portions thereof (e.g., computationally equivalent operations) may be derived and substituted for the equations shown herein.

Referring again to FIG. 7, in the illustrated embodiment, the result packed data operand 758 has, a first 32-bit temporary result ($W_{TMP0}$) in bits [31:0], $W_{TMP1}$ in bits [63:32], $W_{TMP2}$ in bits [95:64], and $W_{TMP3}$ in bits [127:96]. In some embodiments, $W_{TMP0}$-$W_{TMP3}$ may be equivalent to the following calculations being performed by the processor:

$T0 = W_j$ XOR $W_{j+7}$ XOR $(W_{j+13} <<< 15)$
$T1 = W_{j+1}$ XOR $W_{j+8}$ XOR $(W_{j+14} <<< 15)$
$T2 = W_{j+2}$ XOR $W_{j+9}$ XOR $(W_{j+15} <<< 15)$
$T3 = W_{j+3}$ XOR $W_{j+10}$
$W_{TMP0} = P1(T0)$
$W_{TMP1} = P1(T1)$
$W_{TMP2} = P1(T2)$
$W_{TMP3} = P1(T3)$

In one particular embodiment, the first source operand 752 be in an implicitly indicated 128-bit source register, the second source operand 754 may be in an explicitly specified 128-bit source register, the third source operand 756 may be in an explicitly specified 128-bit source/destination register, and the result operand 758 may be written over the third source operand 756 in the source/destination register, although the scope of the invention is not so limited.

FIG. 8 is a block diagram illustrating an embodiment of an SM3 four message expansion completion operation 860 that may be performed in response to an embodiment of an SM3 four message expansion completion instruction. In the illustrated embodiment, the instruction specifies or otherwise indicates a first 128-bit source packed data operand 862, a second 128-bit source packed data operand 864, and a third 128-bit source packed data operand 866. As before, the use of 128-bit operands may offer certain advantages, for example allowing use of the instructions in processors that have 128-bit packed data registers but not 256-bit packed data registers, but is not required. In other embodiments, different numbers and sizes of operands may optionally be used, such as, for example, 64-bit operands, 256-bit operands, a combination of different sized operands, etc.

The first, second, and third source operands may be used to provide a remaining complementary subset of the sixteen different messages needed to generate the four new messages for the four sequential and consecutive rounds. In some embodiments, the messages may represent those sufficient to evaluate remaining pieces/portions of the four instances of Equation 4 not evaluated by the instruction/operation of FIG. 7. For example, in the illustrated embodiment, the first source operand 862 has, the 32-bit message $W_{j+10}$ in bits [31:0], the message $W_{j+11}$ in bits [63:32], the message $W_{j+12}$ in bits [95:64], and the message $W_{j+13}$ in bits [127:96]. The second source operand 864 has, the message $W_{j+3}$ in bits [31:0], the message $W_{j+4}$ in bits [63:32], the message $W_{j+5}$ in bits [95:64], and the message $W_j$ in bits [127:96]. The third source operand 866 has, the first temporary result ($W_{TMP0}$) in bits [31:0], the second temporary result ($W_{TMP1}$) in bits [63:32], the third temporary result ($W_{TMP2}$) in bits [95:64], and the fourth temporary result ($W_{TMP3}$) in bits [127:96]. In one aspect, the third source packed data operand 866 may optionally be the same operand as the result packed data operand 758.

In the illustrated embodiment, the first source operand 862 optionally has four messages corresponding to four consecutive rounds, and optionally arranged according to round order (e.g., ascending round order with increasing bit significance). Likewise, the second source operand 864 optionally has four messages corresponding to three consecutive rounds, and optionally arranged according to round order (e.g., ascending round order). The third source operand 866 optionally has four temporary results $W_{TMP0}$ to $W_{TMP3}$. In another embodiment, a reverse or reflected order of the messages within in the operands may optionally be used if desired (e.g., the messages may be arranged in descending order within each of the operands). Storing messages for adjacent rounds within the same operand, storing messages for adjacent rounds in round order within the operands, and storing the adjacent messages of each of the operands in the same round order (e.g., all arranged in ascending round order), may help to increase the efficiency of managing the rearrangement of messages between rounds, but is not required. In other embodiments, the messages and/or the temporary results ($W_{TMP0}$ to $W_{TMP3}$) may optionally be rearranged through various intra-operand and/or inter-operand rearrangements. Moreover, in other embodiments, other numbers and/or sizes of operands may optionally be used, if desired.

Referring again to FIG. 8, a result packed data operand 868 may be generated (e.g., by an execution unit 824) and stored in a destination storage location in response to the SM3 four message expansion completion instruction/operation. The destination storage location may be specified or otherwise indicated by the instruction. The destination storage location may be a packed data register, a memory location, or other storage location. In some embodiments, the result packed data operand 868 may include four messages for four sequential and consecutive rounds. As shown, in the illustrated embodiment, the result packed data operand 868 has, a first 32-bit message $W_{j+16}$ to be input to round (j+16) of the compression function of the SM3 hash function in bits [31:0], a second 32-bit message $W_{j+17}$ to be input to round (j+17) in bits [63:32], a third 32-bit message $W_{j+18}$ to be input to round (j+18) in bits [95:64], and a fourth 32-bit message $W_{j+19}$ to be input to round (j+19) in bits [127:96].

In some embodiments, $W_{j+16}$ to $W_{j+19}$ may be evaluated to be consistent with the following operations:

$W_{j+16} = (W_{j+3} <<< 7)$ XOR $W_{j+10}$ XOR $W_{TMP0}$
$W_{j+17} = (W_{j+4} <<< 7)$ XOR $W_{j+11}$ XOR $W_{TMP1}$
$W_{j+18} = (W_{j+5} <<< 7)$ XOR $W_{j+12}$ XOR $W_{TMP2}$
$W_{j+19} = (W_{j+6} <<< 7)$ XOR $W_{j+13}$ XOR $W_{TMP3}$
$W_{j+19} = W_{j+19}$ XOR $(W_{j+16} <<< 6)$ XOR $(W_{j+16} <<< 15)$ XOR $(W_{j+16} <<< 30)$

Notice $W_{j+16}$ is calculated and then used to complete the evaluation of $W_{j+19}$. Advantageously, this pair of SM3 message expansion operations/instructions may significantly help to increase the speed, efficiency, and/or performance of implementing the SM3 message generation (e.g., by avoiding an otherwise high instruction count and complexity through conventional software approaches). It is to be appreciated that this is just one illustrative example of a suitable pair of instructions.

In other embodiments, other pieces of the four instances of Equation 4 shown above may optionally be evaluated by the first instruction of the pair and the remaining pieces may be evaluated by the second subsequent instruction. Correspondingly, different subsets of the messages may be provided by the first instruction of the pair versus those provided by the second instruction of the pair. That is, there is flexibility in apportioning the messages between the first and second instructions as long as the messages provided can be used to evaluate pieces of the instances of Equation 4 that can be passed as intermediate results from the first instruction to the second subsequent instruction which may use them and the remaining not yet provided messages to complete the evaluations of these instances of Equation 4.

In one particular embodiment, the first source operand 862 may be in an implicitly indicated 128-bit source register, the second source operand 864 may be in an explicitly specified 128-bit source register, the third source operand 866 may be in an explicitly specified 128-bit source/destination register, and the result operand 868 may be written over the third source operand 866 in the source/destination register, although the scope of the invention is not so limited.

The instructions and processors described here are intended to implement the SM3 Chinese cryptographic hash function and obtain values that are consistent therewith.

Any possible discrepancies or inconsistencies in the description (e.g., due to typographical errors, translation errors, errors in the description, or otherwise) that would lead to results inconsistent with the SM4 algorithm are unintentional and erroneous. In addition, while the current version of the SM3 algorithm has been described, it is to be appreciated that embodiments are also applicable to extensions of this standard (e.g., SMx Chinese cryptographic hash standards where SMx represents a future version of SM3), derivations of this standard, modifications of this standard, related standards, and the like, which meet the limitations of the claims. As used herein, SM3 refers to the described and known algorithm regardless of whether it is called SM3, or some other name.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

Exemplary Core Architectures

In-order and out-of-order core block diagram In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the INTEL® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
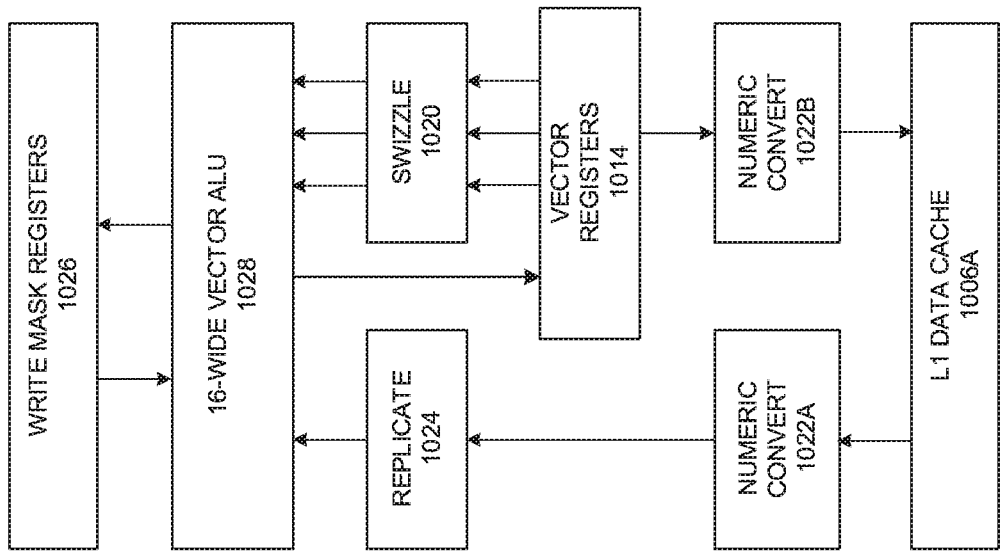
FIG. 10B is a block diagram of an embodiment of an expanded view of part of the processor core of FIG. 10A.
Figure 10A:
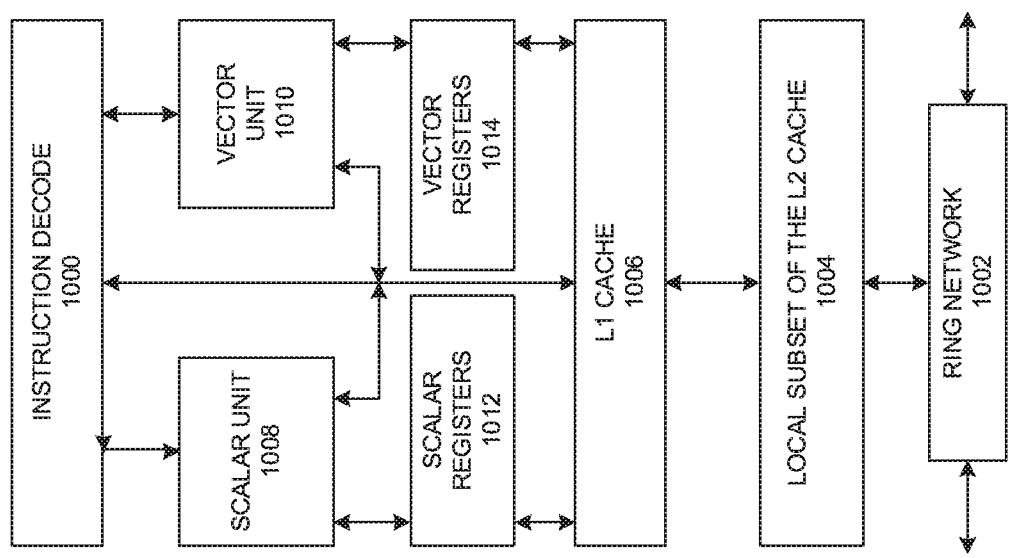
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
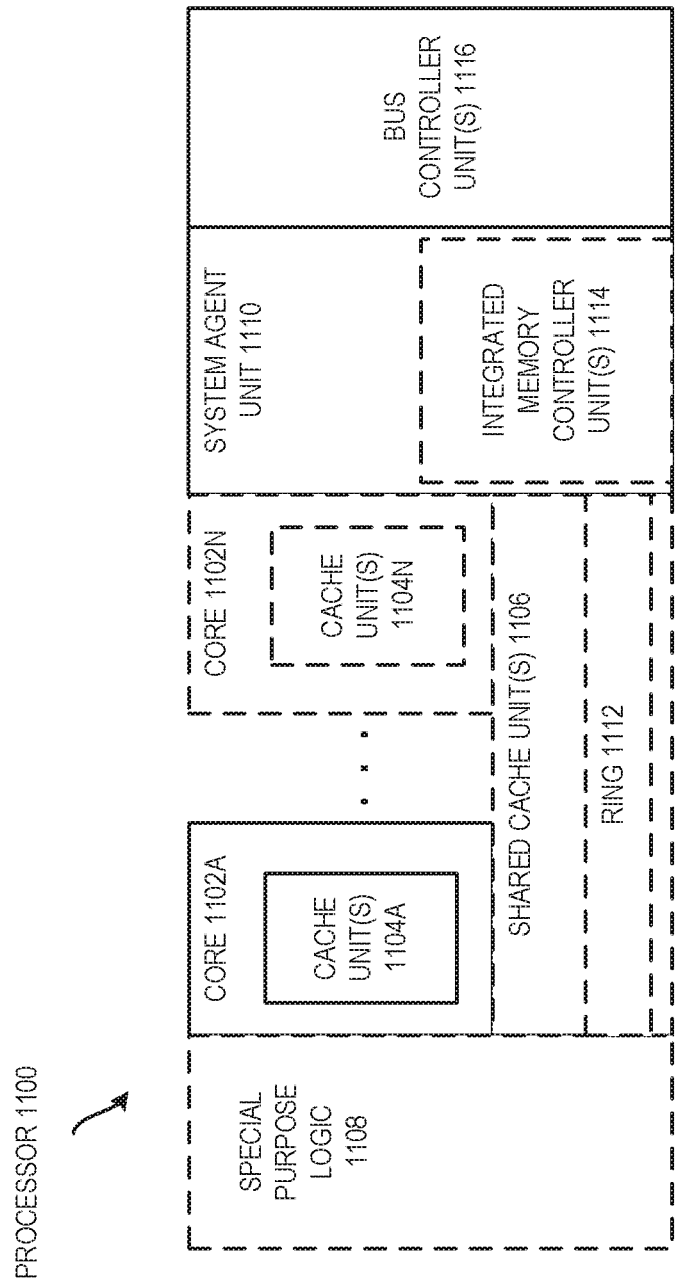
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
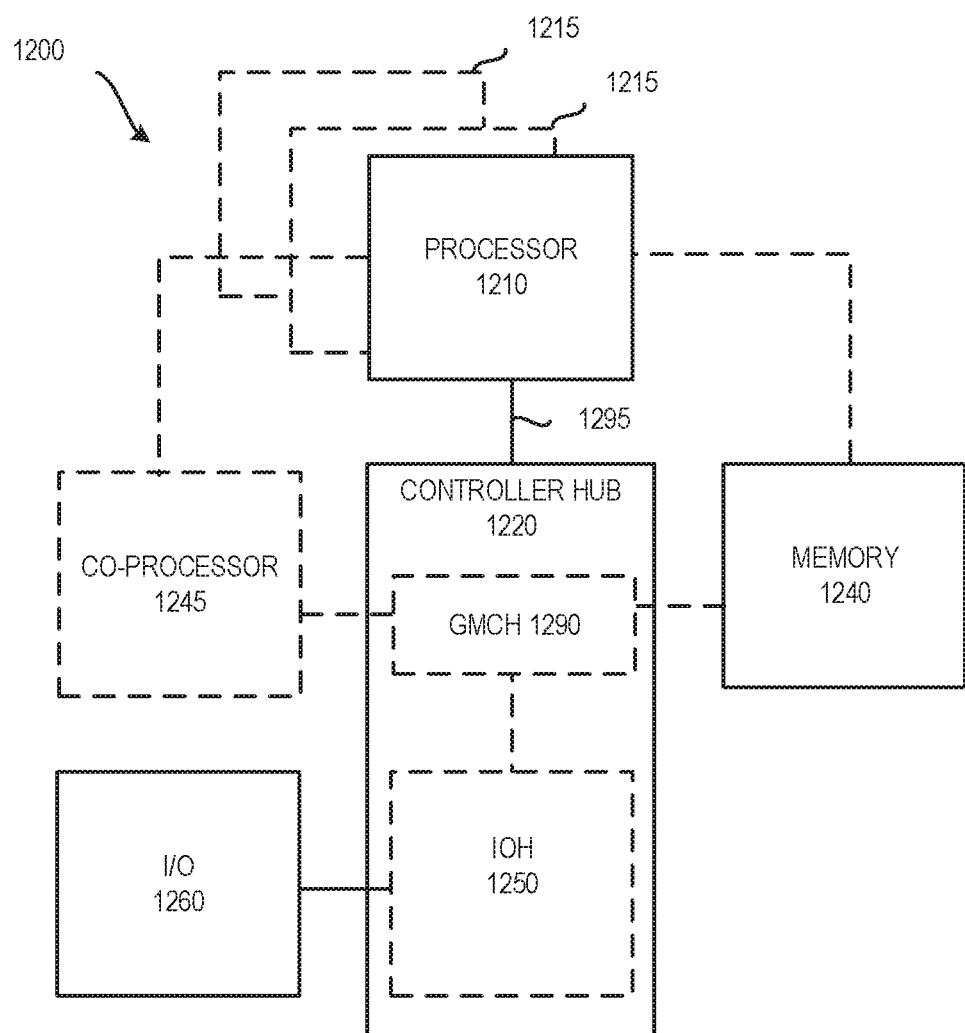
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245.

Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
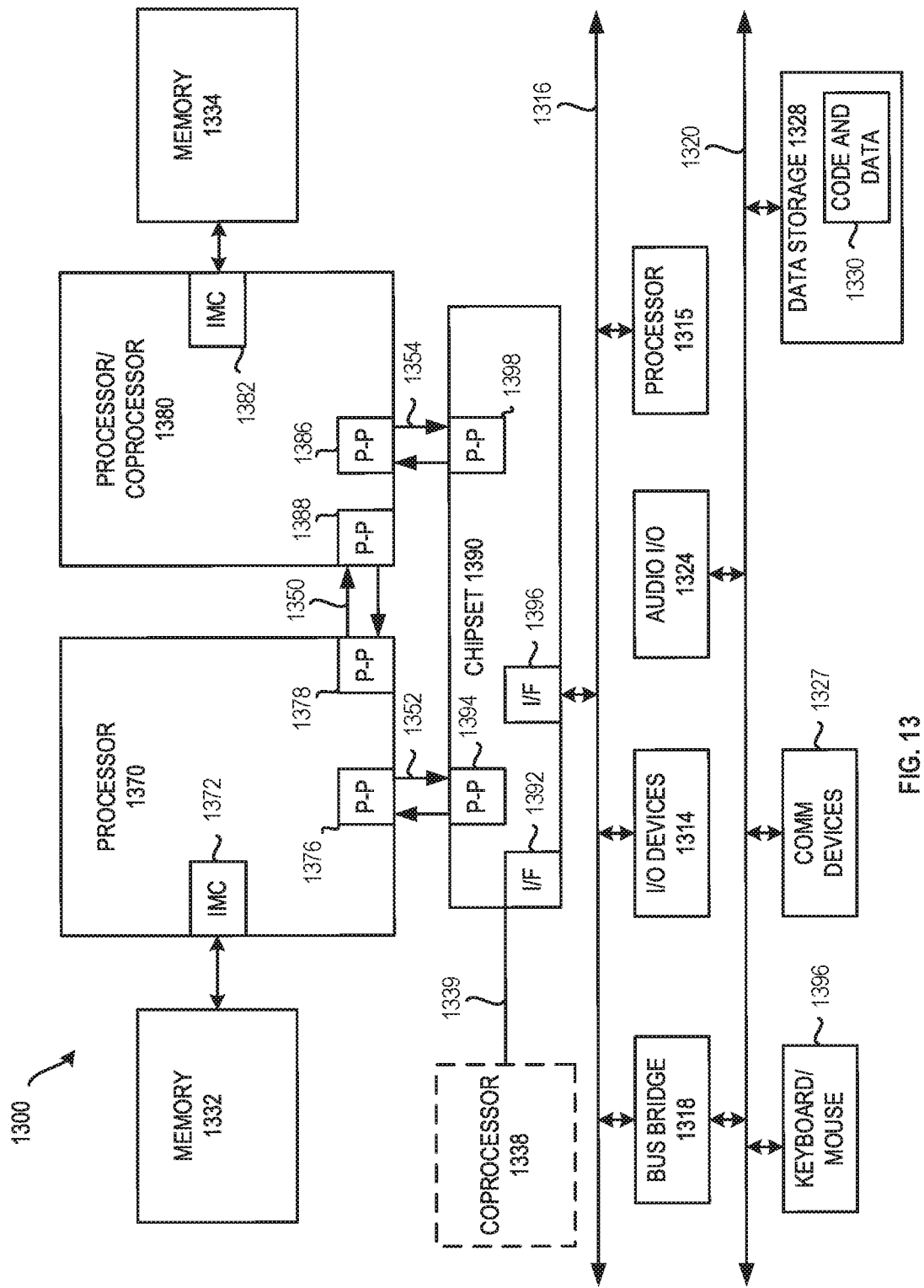
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320.

In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
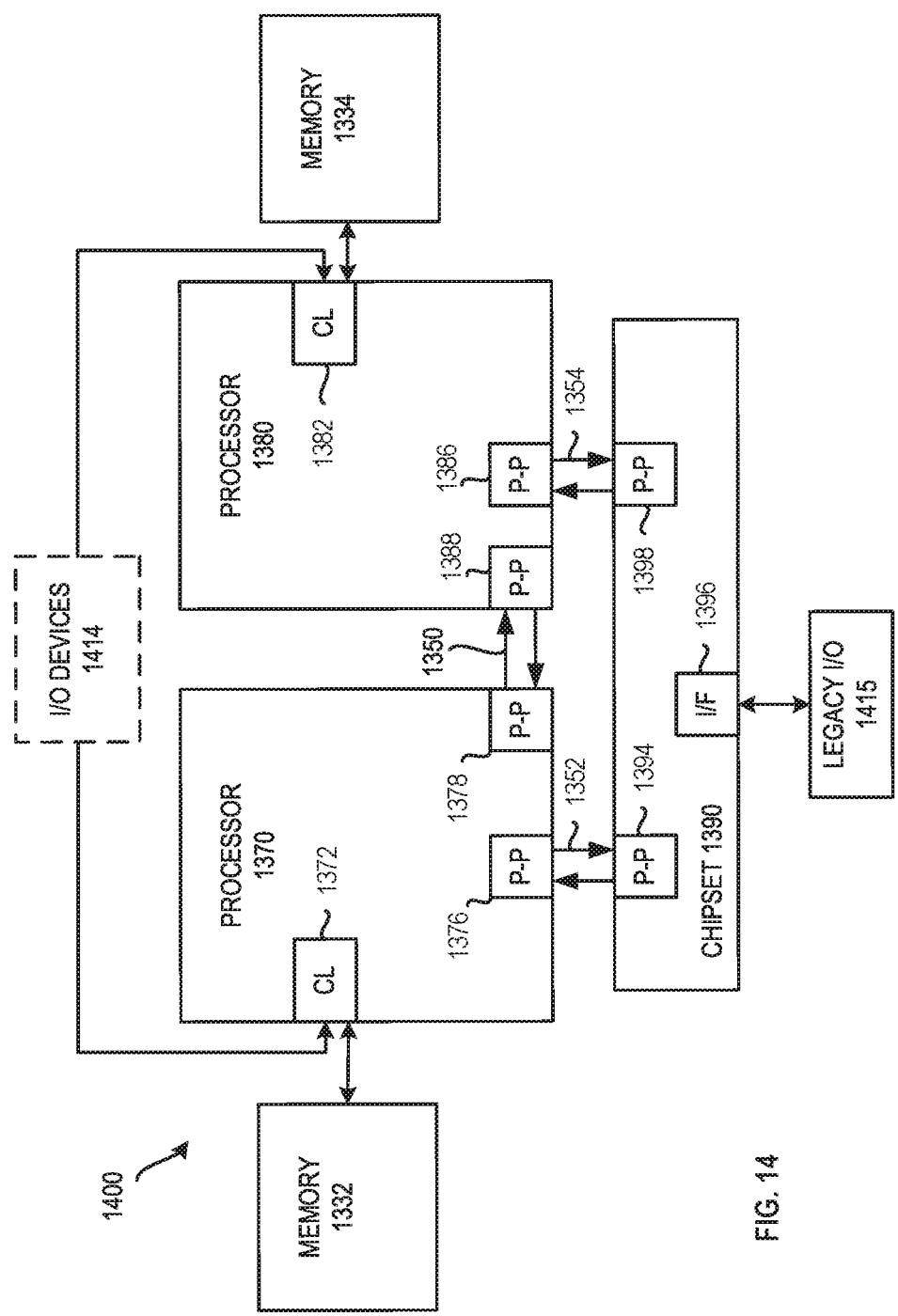
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
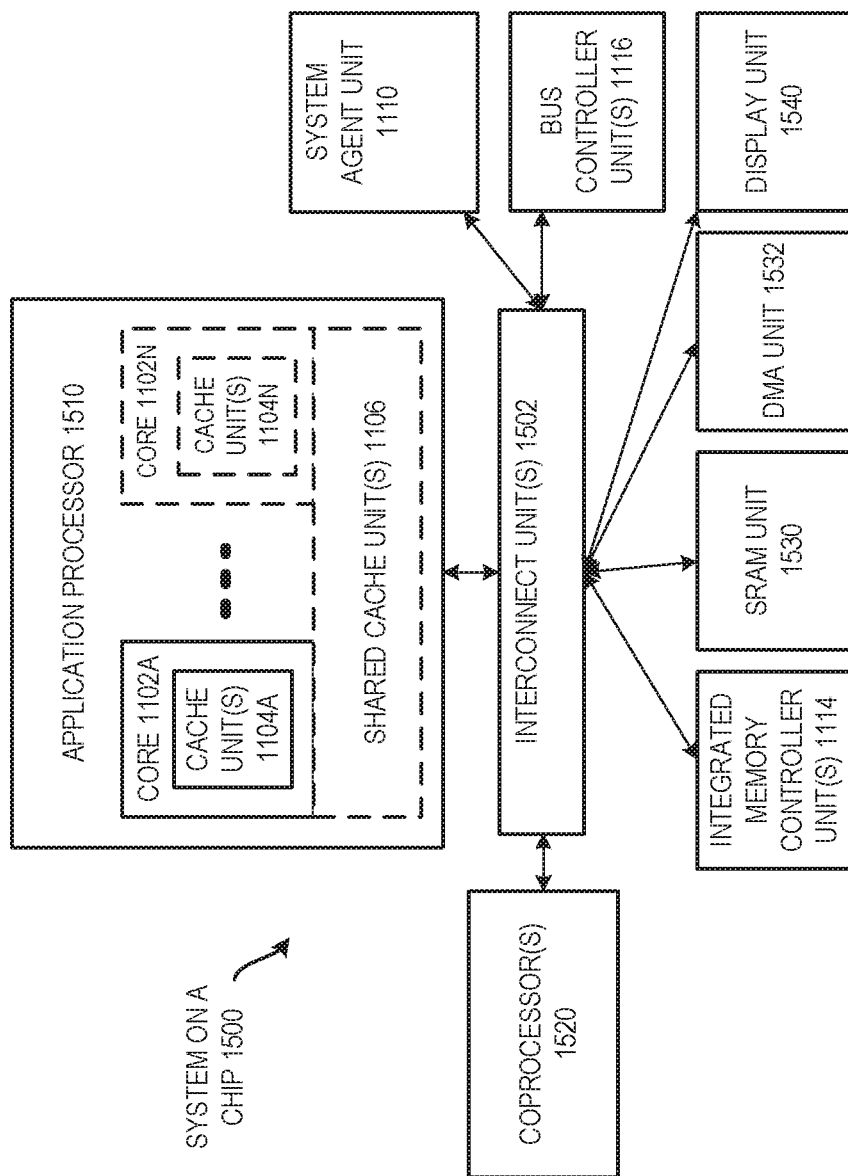
FIG. 15 is a block diagram of an embodiment of a system-on-a-chip architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays.

In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
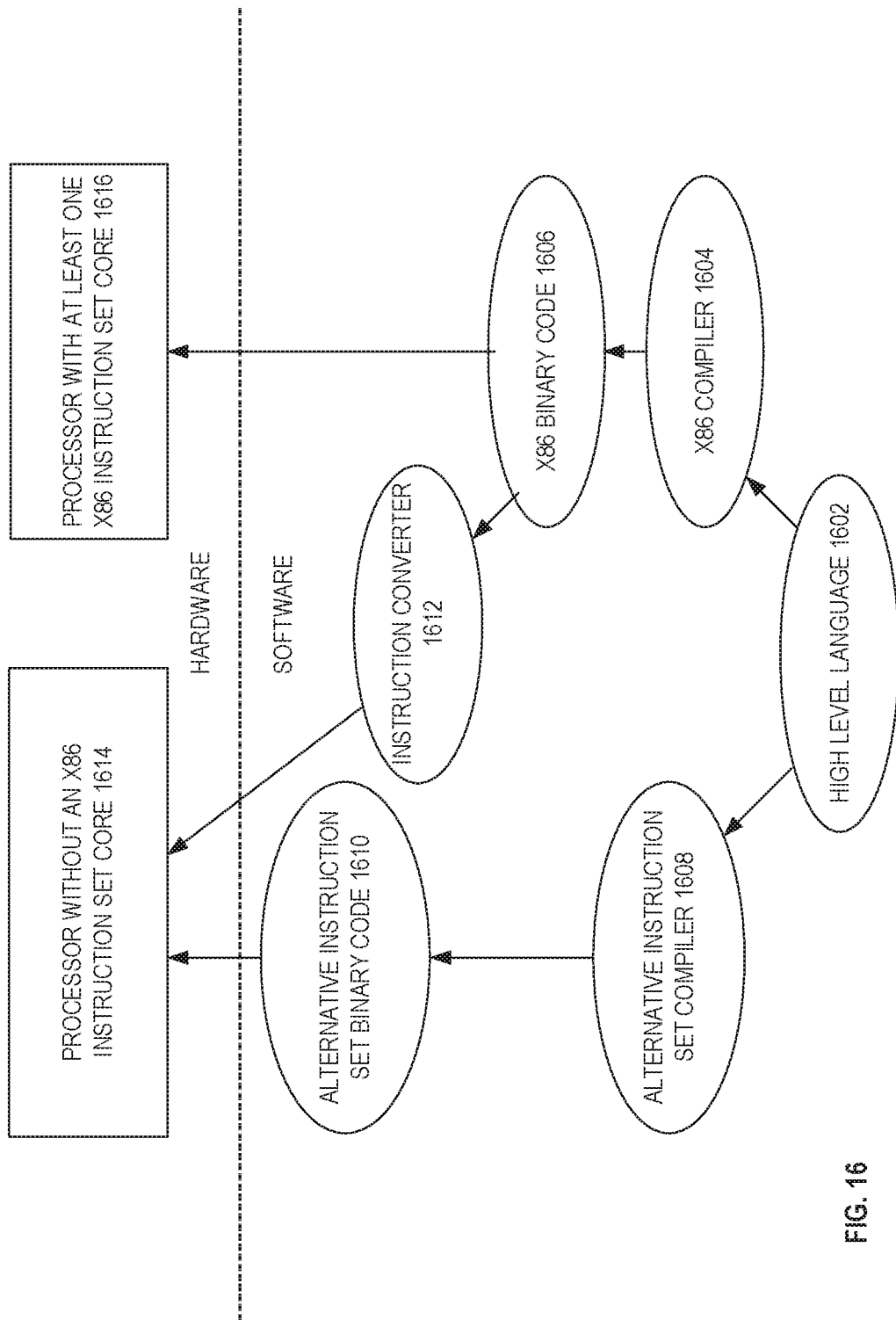
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an INTEL processor with at least one x86 instruction set core by compatibly executing or otherwise processing (1) a substantial portion of the instruction set of the INTEL x86 instruction set core or (2) object code versions of applications or other software targeted to run on an INTEL processor with at least one x86 instruction set core, in order to achieve substantially the same result as an INTEL processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 1-2 and 5-8 may also optionally be used in any of FIGS. 3-4. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems, systems-on-chip (SoC) or other systems disclosed herein. In some embodiments, the instructions may have features or details of the instruction formats disclosed herein, although this is not required.

In the description and claims, the terms "coupled" and/or "connected," along with their derivatives, may have been used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may store or otherwise provide one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects.

This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to decode an SM3 two round state word update instruction. The SM3 two round state word update instruction is to indicate one or more source packed data operands. The one or more source packed data operands are to have eight 32-bit state words $A_j$, $B_j$, $C_j$, $D_j$, $E_j$, $F_j$, $G_j$, and $H_j$ that are to correspond to a round (j) of an SM3 hash algorithm. The one or more source packed data operands are also to have a set of messages that are sufficient to evaluate two rounds of the SM3 hash algorithm. The processor also includes an execution unit coupled with the decode unit. The execution unit is operable, in response to the SM3 two round state word update instruction, to store one or more result packed data operands, in one or more destination storage locations that are to be indicated by the SM3 two round state word update instruction. The one or more result packed data operands to have at least four two-round updated 32-bit state words $A_{j+2}$, $B_{j+2}$, $E_{j+2}$, and $F_{j+2}$ that are to correspond to a round (j+2) of the SM3 hash algorithm.

Example 2 includes the processor of Example 1, in which the execution unit is operable, in response to the instruction, to store the one or more result packed data operands that are to have only the four two-round updated 32-bit state words $A_{j+2}$, $B_{j+2}$, $E_{j+2}$, and $F_{j+2}$.

Example 3 includes the processor of Example 1, in which the execution unit is operable, in response to the instruction, to store the one or more result packed data operands that are to have eight two-round updated 32-bit state words $A_{j+2}$, $B_{j+2}$, $C_{j+2}$, $D_{j+2}$, $E_{j+2}$, $F_{j+2}$, $G_{j+2}$, and $H_{j+2}$ that are to correspond to the round (j+2) of the SM3 hash algorithm.

Example 4 includes the processor of Example 1, in which the decode unit is to decode the instruction that is to indicate a first source packed data operand that is to have the 32-bit state words $A_j$, $B_j$, $E_j$, and $F_j$. The instruction is also to indicate a second source packed data operand that is to have the 32-bit state words $C_j$, $D_j$, $G_j$, and $H_j$.

Example 5 includes the processor of Example 4, in which execution unit is operable, in response to the instruction, to store a single result packed data operand that is to have only the four two-round updated 32-bit state words $A_{j+2}$, $B_{j+2}$, $E_{j+2}$, and $F_{j+2}$.

Example 6 includes the processor of Example 5, in which execution unit is operable, in response to the SM3 two round state word update instruction, to store the single result packed data operand in a storage location that is implicitly to be used for both the single result packed data operand and the second source packed data operand.

Example 7 includes the processor of Example 5, in which the decode unit is to decode a second instruction that is to indicate a source packed data operand that is to have the 32-bit state words $A_j$, $B_j$, $E_j$, and $F_j$. The processor is operable, in response to the second instruction, to store a result packed data operand in a destination storage location that is to be indicated by the second instruction. The result packed data operand is to have four two-round updated 32-bit state words $C_{j+2}$, $D_{j+2}$, $G_{j+2}$, and $H_{j+2}$ that are to correspond to the round (j+2) of the SM3 hash algorithm.

Example 8 includes the processor of any one of Examples 1 to 7, in which the decode unit is to decode the instruction that is to indicate the one or more source packed data operands that are to have one of: four 32-bit messages $W_j$, $W_{j+1}$, $W_j$+, and $W_{j+5}$; and four 32-bit messages $W_j$, $W_{j+1}$, $W'_j$, and $W'_{j+1}$.

Example 9 includes the processor of any one of Examples 1 to 7, in which the decode unit is to decode the instruction that is to indicate a round number.

Example 10 includes the processor of Example 9, in which the decode unit is to decode the instruction that is to have an immediate to indicate the round number.

Example 11 includes the processor of any one of Examples 1 to 7, in which the decode unit is to decode the instruction that is to indicate three 128-bit source packed data operands that are to have the eight 32-bit state words $A_j$, $B_j$, $C_j$, $D_j$, $E_j$, $F_j$, $G_j$, and $H_j$ and the set of messages that are sufficient to evaluate the two rounds of the SM3 hash algorithm.

Example 12 includes the processor of Example 11, in which the decode unit is to decode the instruction that is to explicitly specify two of the three 128-bit source packed data operands, and implicitly indicate one of the three 128-bit source packed data operands. Also, it is to be implicit to use a storage location both for one of the three 128-bit source packed data operands and also to store a result packed data operand, and in which the processor has a plurality of 256-bit packed data registers.

Example 13 includes the processor of any one of Examples 1 to 7, in which logic of the execution unit to be used to implement at least one of an $FF_j$ function and $GG_j$ function of the SM3 hash algorithm is also to be used to implement at least one of a Maj function and a Ch function of a Secure Hash Algorithm.

Example 14 includes the processor of any one of Examples 1 to 7, in which the execution unit is operable, in response to the instruction, during each of two rounds, to perform operations including: evaluating an $FF_j$ Boolean function; evaluating a $GG_j$ Boolean function; and evaluating a $P_0$ permutation function.

Example 15 is a method in a processor that includes receiving an SM3 two round state word update instruction indicating one or more source packed data operands. The one or more source packed data operands have eight 32-bit state words $A_j$, $B_j$, $C_j$, $D_j$, $E_j$, $F_j$, $G_j$, and $H_j$ for a round (j) of an SM3 hash algorithm, and the one or more source packed data operands having four messages to evaluate two rounds of the SM3 hash algorithm. The method also includes storing one or more result packed data operands, in one or more destination storage locations indicated by the SM3 two round state word update instruction, in response to the SM3 two round state word update instruction. The one or more result packed data operands have at least four two-round updated 32-bit state words $A_{j+2}$, $B_{j+2}$, $E_{j+2}$, and $F_{j+2}$, which have been updated by the two rounds of the SM3 hash algorithm relative to $A_j$, $B_j$, $E_j$, and $F_j$.

Example 16 includes the method of Example 15, in which receiving includes receiving the instruction that indicates a round number and that indicates the one or more source packed data operands that have one of: four 32-bit messages $W_j$, $W_{j+1}$, $W_{j+4}$, and $W_{j+5}$; and four 32-bit messages $W_j$, $W_{j+1}$, $W'_j$, and $W'_{j+1}$.

Example 17 includes the method of any one of Examples 15 and 16, in which storing includes storing the one or more result packed data operands that have eight two-round updated 32-bit state words $A_{j+2}$, $B_{j+2}$, $C_{j+2}$, $D_{j+2}$, $E_{j+2}$, $F_{j+2}$, $G_{j+2}$, and $H_{j+2}$, which have been updated by the two rounds of the SM3 hash algorithm.

Example 18 includes the method of any one of Examples 15 and 16, in which receiving includes receiving the instruction that indicates a first source packed data operand having the 32-bit state words $A_j$, $B_j$, $E_j$, and $F_j$, and indicates a second source packed data operand having the 32-bit state words $C_j$, $D_j$, $G_j$, and Hi.

Example 19 includes the method of any one of Examples 15 and 18, in which storing includes storing a single result packed data operand that has only the four two-round updated 32-bit state words $A_{j+2}$, $B_{j+2}$, $E_{j+2}$, and $F_{j+2}$.

Example 20 includes the method of any one of Examples 15, 18, and 19, further including receiving a second instruction that indicates a source packed data operand having the 32-bit state words $A_j$, $B_j$, $E_j$, and $F_j$. The method further includes storing a result packed data operand, in a destination storage location indicated by the second instruction, in response to the second instruction. The result packed data operand has four two-round updated 32-bit state words $C_{j+2}$, $D_{j+2}$, $G_{j+2}$, and $H_{j+2}$ that are to correspond to a round (j+2) of the SM3 hash algorithm.

Example 21 is a system to process instructions that includes an interconnect and a processor coupled with the interconnect. The processor is to receive a two round state word update instruction for a hash algorithm. The hash algorithm utilizes a parameter $T_j$ having a hexadecimal value of 79cc4519 for a first set of rounds and a hexadecimal value of 79cc4519 for a second set of rounds. The two round state word update instruction is to indicate one or more source packed data operands. The one or more source packed data operands are to have eight 32-bit state words $A_j$, $B_j$, $C_j$, $D_j$, $E_j$, $F_j$, $G_j$, and $H_j$ that are to correspond to a round (j) of the hash algorithm, and the one or more source packed data operands to have a set of messages that are sufficient to evaluate two rounds of the hash algorithm. The processor, in response to the two round state word update instruction, is to store one or more result packed data operands, in one or more destination storage locations that are to be indicated by the two round state word update instruction. The one or more result packed data operands to have at least four state words $A_{j+2}$, $B_{j+2}$, $E_{j+2}$, and $F_{j+2}$, which respectively have been updated by two rounds of the hash algorithm relative to the four 32-bit state words $A_j$, $B_j$, $E_j$, and $F_j$. The system also includes a dynamic random access memory (DRAM) coupled with the interconnect. The DRAM stores a set of instructions to implement the hash algorithm. The set of instructions, when executed by the processor, to cause the processor to perform operations including using $A_j$, $B_j$, $E_j$, and $F_j$ to generate $C_{j+2}$, $D_{j+2}$, $G_{j+2}$, and $H_{j+2}$, which respectively have been updated by two rounds of the hash algorithm relative to $C_j$, $D_j$, $G_j$, and $H_j$.

Example 22 includes the system of Example 21, in which using the $A_j$, $B_j$, $E_j$, and $F_j$ to generate the $C_{j+2}$, $D_{j+2}$, $G_{j+2}$ is responsive to a single instruction.

Example 23 is an article of manufacture including a non-transitory machine-readable storage medium. The non-transitory machine-readable storage medium stores an SM3 two round state word update instruction. The SM3 two round state word update instruction is to indicate one or more source packed data operands. The one or more source packed data operands are to have eight 32-bit state words $A_j$, $B_j$, $C_j$, $D_j$, $E_j$, $F_j$, $G_j$, and $H_j$ for a round (j) of an SM3 hash algorithm, and the one or more source packed data operands to have four messages sufficient to evaluate two rounds of the SM3 hash algorithm. The SM3 two round state word update instruction if executed by a machine is to cause the machine to perform operations including generating at least four two-round updated 32-bit state words $A_{j+2}$, $B_{j+2}$, $E_{j+2}$, and $F_{j+2}$, which respectively have been updated by two rounds of the SM3 hash algorithm relative to $A_j$, $B_j$, $E_j$, and $F_j$. The operations also include storing the at least four 32-bit state words $A_{j+2}$, $B_{j+2}$, $E_{j+2}$, and $F_{j+2}$ in one or more destination storage locations that are to be indicated by the SM3 two round state word update instruction.

Example 24 includes the article of manufacture of Example 23, in which storing includes storing the at least four 32-bit state words $A_{j+2}$, $B_{j+2}$, $E_{j+2}$, and $F_{j+2}$ in a 128-bit register, and in which the storage medium further includes an instruction that if executed by the machine is to cause the machine to perform operations including generating four two-round updated 32-bit state words $C_{j+2}$, $D_{j+2}$, $G_{j+2}$, and $H_{j+2}$ from four 32-bit state words $A_j$, $B_j$, $E_j$, and $F_j$.

Example 25 includes a processor or other apparatus that is operative to perform the method of any one of Examples 15-20.

Example 26 includes a processor or other apparatus that includes means for performing the method of any one of Examples 15-20.

Example 27 includes a processor that includes any combination of modules, units, logic, circuitry, and means to perform the method of any one of Examples 15-20.

Example 28 includes an article of manufacture that includes an optionally non-transitory machine-readable medium that optionally stores or otherwise provides an instruction that if and/or when executed by a processor, computer system, or other machine is operative to cause the machine to perform the method of any one of Examples 15-20.

Example 29 includes a computer system or other electronic device including an interconnect, the processor of any one of Examples 1-14 coupled with the interconnect, and at least one component coupled with the interconnect that is selected from a dynamic random access memory (DRAM), a network interface, a graphics chip, a wireless communications chip, a Global System for Mobile Communications (GSM) antenna, a phase change memory, and a video camera.

Example 30 includes a processor or other apparatus substantially as described herein.

Example 31 includes a processor or other apparatus that is operative to perform any method substantially as described herein.

Example 32 includes a processor or other apparatus including means for performing any method substantially as described herein.

Example 33 includes a processor or other apparatus that is operative to perform any SM3 hash algorithm acceleration instruction substantially as described herein.

Example 34 includes a processor or other apparatus including means for performing any SM3 hash algorithm acceleration instruction substantially as described herein.

Example 35 includes a processor or other apparatus including a decode unit that is operable to decode instructions of a first instruction set. The decode unit is to receive one or more instructions that emulate a first instruction, which may be any of the SM3 hash algorithm acceleration instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 36 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the SM3 hash algorithm acceleration instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
  a decode unit to decode an SM3 two round state word update instruction, and an SM3 four message expansion initiation instruction, the SM3 two round state word update instruction to indicate one or more source packed data operands, the one or more source packed data operands to have eight 32-bit state words $A_j$, $B_j$, $C_j$, $D_j$, $E_j$, $F_j$, $G_j$, and $H_j$ that are to correspond to a round (j) of an SM3 hash algorithm, and the one or more source packed data operands to have a set of messages that are sufficient to evaluate two rounds of the SM3 hash algorithm, the SM3 four message expansion initiation instruction to indicate one or more source packed data operands that are to have a first subset of a set of message information sufficient to generate four new 32-bit messages for four sequential and consecutive rounds of an SM3 hash algorithm, and the SM3 four message expansion initiation instruction to indicate one or more destination storage locations;
  a first execution unit coupled with the decode unit, the first execution unit configured, in response to the SM3 two round state word update instruction, to store one or more result packed data operands, in one or more destination storage locations that are to be indicated by the SM3 two round state word update instruction, the one or more result packed data operands to have at least four two-round updated 32-bit state words $A_{j+2}$, $B_{j+2}$, $E_{j+2}$, and $F_{j+2}$ that are to correspond to a round (j+2) of the SM3 hash algorithm; and
  a second execution unit coupled with the decode unit, the second execution unit configured, in response to the SM3 four message expansion initiation instruction, to store one or more result packed data operands in the one or more destination storage locations indicated by the SM3 four message expansion initiation instruction, the one or more result packed data operands for the SM3 four message expansion initiation instruction to include four intermediate results, each intermediate result representing a partial generation of a corresponding one of the four new 32-bit messages.

* * * * *